United States Patent
Chakraborty et al.

(10) Patent No.: US 10,152,387 B1
(45) Date of Patent: Dec. 11, 2018

(54) INSTANT START OF VIRTUAL MACHINE FROM ARCHIVE COPY ON BACKUP MEDIA

(71) Applicant: EMC IP Holding Company LLC, Hopkinton, MA (US)

(72) Inventors: Anupam Chakraborty, Bangalore (IN); Satyendra Nath Sharma, Bangalore (IN); Tushar Dethe, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 75 days.

(21) Appl. No.: 15/389,691

(22) Filed: Dec. 23, 2016

(51) Int. Cl.
  *G06F 11/14* (2006.01)
  *G06F 11/20* (2006.01)
  *G06F 9/455* (2018.01)

(52) U.S. Cl.
  CPC ...... *G06F 11/1451* (2013.01); *G06F 9/45558* (2013.01); *G06F 11/1464* (2013.01); *G06F 11/1469* (2013.01); *G06F 11/2023* (2013.01); *G06F 11/1448* (2013.01); *G06F 11/1458* (2013.01); *G06F 2009/45583* (2013.01); *G06F 2009/45595* (2013.01); *G06F 2201/815* (2013.01)

(58) Field of Classification Search
  CPC ............ G06F 11/1469; G06F 11/1448; G06F 11/008; G06F 11/1458
  See application file for complete search history.

(56) References Cited

U.S. PATENT DOCUMENTS

| | | | | |
|---|---|---|---|---|
| 2010/0049750 A1* | 2/2010 | Srivastava | .......... | G06F 11/1435 707/E17.005 |
| 2012/0089576 A1* | 4/2012 | Singla | ............... | G06F 17/30091 707/674 |
| 2012/0158665 A1* | 6/2012 | Lee | ..................... | G06F 11/1448 707/678 |
| 2013/0014102 A1* | 1/2013 | Shah | ................... | G06F 9/45558 718/1 |

* cited by examiner

Primary Examiner — Jigar P Patel
(74) Attorney, Agent, or Firm — Staniford Tomita LLP

(57) ABSTRACT

A differencing virtual hard disk is created at a recovery server. The differencing disk is pointed to a virtual machine that has been backed up to a backup media server. A configuration file associated with the backed up virtual machine is restored to the recovery server while the backed up virtual machine remains on the backup media server. A planned virtual machine is created from the configuration file. Virtual hard disk settings of the planned virtual machine are modified to point to the differencing disk at the recovery server. Parameters of the planned virtual machine are modified based on a path of the configuration file as restored on the recovery server. The planned virtual machine is realized.

15 Claims, 18 Drawing Sheets

INSTANT START OF VIRTUAL MACHINE FROM ARCHIVE COPY ON BACKUP MEDIA

CROSS-REFERENCE TO RELATED APPLICATIONS

This application is related to co-pending U.S. patent application Ser. No. 15/389,354, filed Dec. 22, 2016, which is incorporated by reference along with all other references cited herein.

TECHNICAL FIELD

Embodiments are generally directed to networked-based data backup methods, and more specifically to reducing the time to restore large objects.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

In today's digital society organizations depend on having ready access to their data. Data, however, can be lost in a variety of ways such as through accidental deletion, data corruption, disasters and catastrophes (e.g., fires or flooding), media failures (e.g., disk crash), computer viruses, and so forth. Thus, it is important to backup data in the event that the data needs to be restored.

A problem with restoring a backup, however, is the time required for the restore. For example, a backed up object such as a big data application or virtual machine may be many gigabytes in size. It can take a great deal of time to recover such a large amount of data. As a result, a production environment that has suffered a failure may be unavailable for some period of time. Further, backup administrators may wish to routinely test the recovery of a backup or may wish to recover a backup for purposes other than disaster recovery. For example, a backup may be recovered for analytical purposes. Again, in all these cases the restoration process can be very lengthy and time-consuming, thus leading to a decrease in overall productivity.

Therefore, there is a need for improved systems and techniques to reduce the amount of time required to recover a backup.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
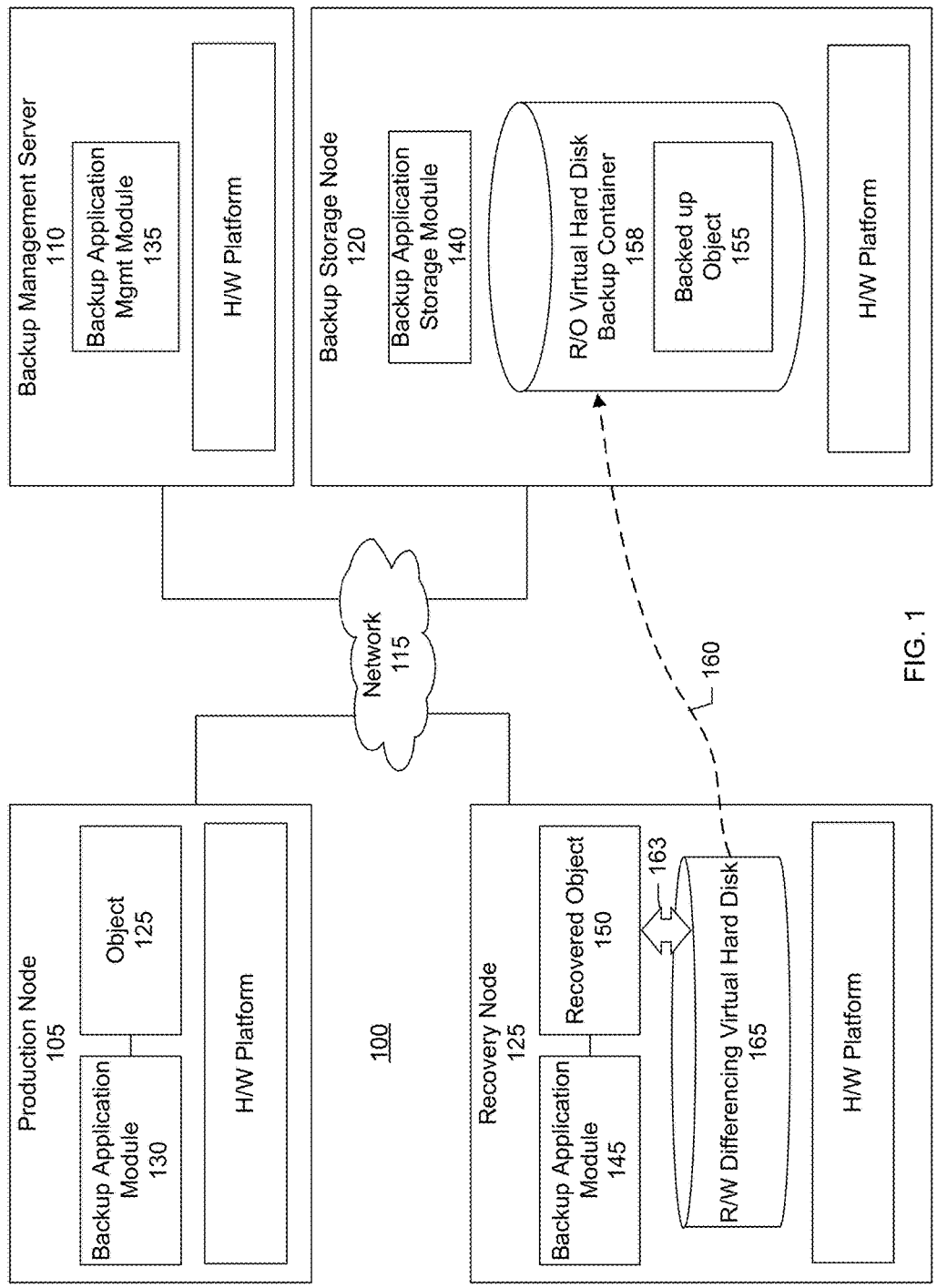
FIG. 1 is a diagram of a large-scale network implementing a data backup and recovery process that provides for backing up and recovering an object, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a non-transitory computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for reducing the time to restore an object such as a big data application, database, or virtual machine. Methods and systems are described for restoring with near zero recovery time objective (RTO). RTO refers to the targeted duration of time within which a business process must be restored after a disaster. The methods and systems can be used as part of a disaster recovery solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for reducing the time to restore, recover, or start an object that has been backed up. The system is well-suited for especially large objects such as a big data application (e.g., email server, database) or large virtual machine. In system 100, there are any number of production servers or nodes 105 that may be backed up such as for purposes of disaster recovery. A network or backup management server computer 110 is coupled directly or indirectly to these clients through network 115, which may be a cloud network, LAN, WAN or other appropriate network.

Network 115 provides connectivity to the various systems, components, and resources of system 100, and may be implemented using protocols such as Transmission Control Protocol (TCP) and/or Internet Protocol (IP), well known in the relevant arts. In a distributed network environment, network 115 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in a backup media of a backup storage node 120. The backup media may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, network system 100 includes backup management server 110, one or more production nodes 105, backup storage node 120, and a recovery server or node 125. The recovery node refers to the destination to which a backup of the object is to be restored. The recovery node may be the same as or a different machine than the production node from which the object was backed up. For example, in some cases, a user such as a backup administrator, may wish to test the recovery of a backup using a recovery node that is separate or different from where the backup was originally performed.

The backup storage and recovery node may be different nodes and separate from each other. The backup storage and recovery node may be local to each other in the same data center such as connected by a local area network (LAN). Alternatively, the backup storage and recovery node may be remote from each other such as in different data centers located in different geographical regions (e.g., San Francisco and San Jose) and connected by a wide area network (WAN).

The system includes a backup application having various components, modules, agents, and so forth to facilitate the backup of an object 125 at the production node. For example, the production node may include a backup application module, agent, or client agent 130, the backup management server may include a module 135, the backup storage node may include a module 140, and the recovery node may include a module 145. The backup application modules interact and communicate with each other to coordinate the backup (and recovery) of the object.

In particular, a production node executes processes of backup application module 130 for backing up data to the storage node, restoring the backed up data, and coordinating with backup management server processes of backup module 135 on the backup server and processes of backup storage module 140 on the storage node. The backup management server may include a user interface such as a graphical user interface (GUI), programmatic interface such as an application programming interface (API), command line interface, or combinations of these. The interface allows a user, such as a backup administrator, to configure a backup, select a backed up object to restore, and select options for the restore.

Processes of the backup management server may include processes to index the backups and identify which savesets reside on which backup devices or volumes. For example, the backup management server may direct the creation of a catalog that stores metadata about the backup. The metadata may include, for example, a time and date of the backup, name of the backup, a location of the source where the backup was performed, a location of a destination where the backup is stored, type information for the object that was backed up (e.g., virtual machine, database, application, and so forth). The backup storage node executes processes for receiving backup information from the backup client, writing data to the backup devices or volumes, sending tracking information to the backup management server to track the data written to the devices or volumes, synthesizing full backups by merging one or more incremental backups into a previous backup, and reading the data from the devices or volumes at the request of the client during a recovery.

The recovery node executes processes of module 145 for quickly restoring, recovering, or starting an object 150 that has been backed up to the backup storage node. In a specific embodiment, the module creates, directs the creation of, modifies, or directs the modification of a differencing virtual hard disk, configuration of the differencing disk, and performs other tasks associated with the restore. Further discussion is provided below.

As shown in the example of FIG. 1, the backup storage node includes an object 155 that has been backed up from the production node. In a specific embodiment, the backed up object is stored in a container 158 formatted as a virtual hard disk (e.g., VHD or VHDx) file. The VHD (or VHDx) format is a container format which can contain disk related information including a file system. In other words, a VHD is a large container file that simulates a hard disk image. The virtual hard disk can appear on the host computer (e.g., recovery node 125) as a local hard disk drive. Volumes such as new technology file system (NTFS), Resilient File System (ReFS), file allocation table (FAT32), or any file system which the operating system (OS) supports on the mounted disk can also be created. Drive letters may be assigned to volumes within a virtual hard disk. The VHD and VHDx formats are similar, however, VHD files have a 2 terabyte (TB) limit and VHDx files have a 64 TB limit. VHD (or VHDx) files can be mounted or attached and used as a regular disk. The terms VHD and VHDx may be used interchangeably to refer to a virtual hard disk. Other examples of virtual hard disk files or container formats that may be suitable include virtual disk image (VDI), virtual machine disk (VMDK), and others.

In an embodiment, system 100 may represent a Data Domain Restorer (DDR)-based deduplication storage system, and a storage server or node having the backup media may be implemented as a DDR Deduplication Storage server provided by Dell EMC. Other similar backup and storage systems, however, are also possible. System 100 may utilize certain protocol-specific namespaces that are the external interface to applications and include NFS (network file system) and CIFS (common internet file system) namespaces, as well as a virtual tape library (VTL) or DD Boost provided by Dell EMC. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

A node or server can be a general purpose computer with software and hardware. The hardware may include a processor, memory, storage (e.g., hard disk), input/output (I/O) controller, network interface, and other computing components, each of which may be interconnected by a bus architecture or any interconnection scheme.

The software may include an operating system, application programs, daemons, drivers, file system device drivers, file system libraries, code modules, and other software components. Examples of operating systems include the Microsoft Windows® family of operating systems (e.g., Windows Server), Linux, HP-UX, UNIX, Sun OS, Solaris, Mac OS X (e.g., Macintosh), Alpha OS, AIX, IRIX32, or IRIX64. Other operating systems may be used. Communications among the components may be via a communication protocol interface, messaging interface, application program interface (API), and the like.

Figure 2:
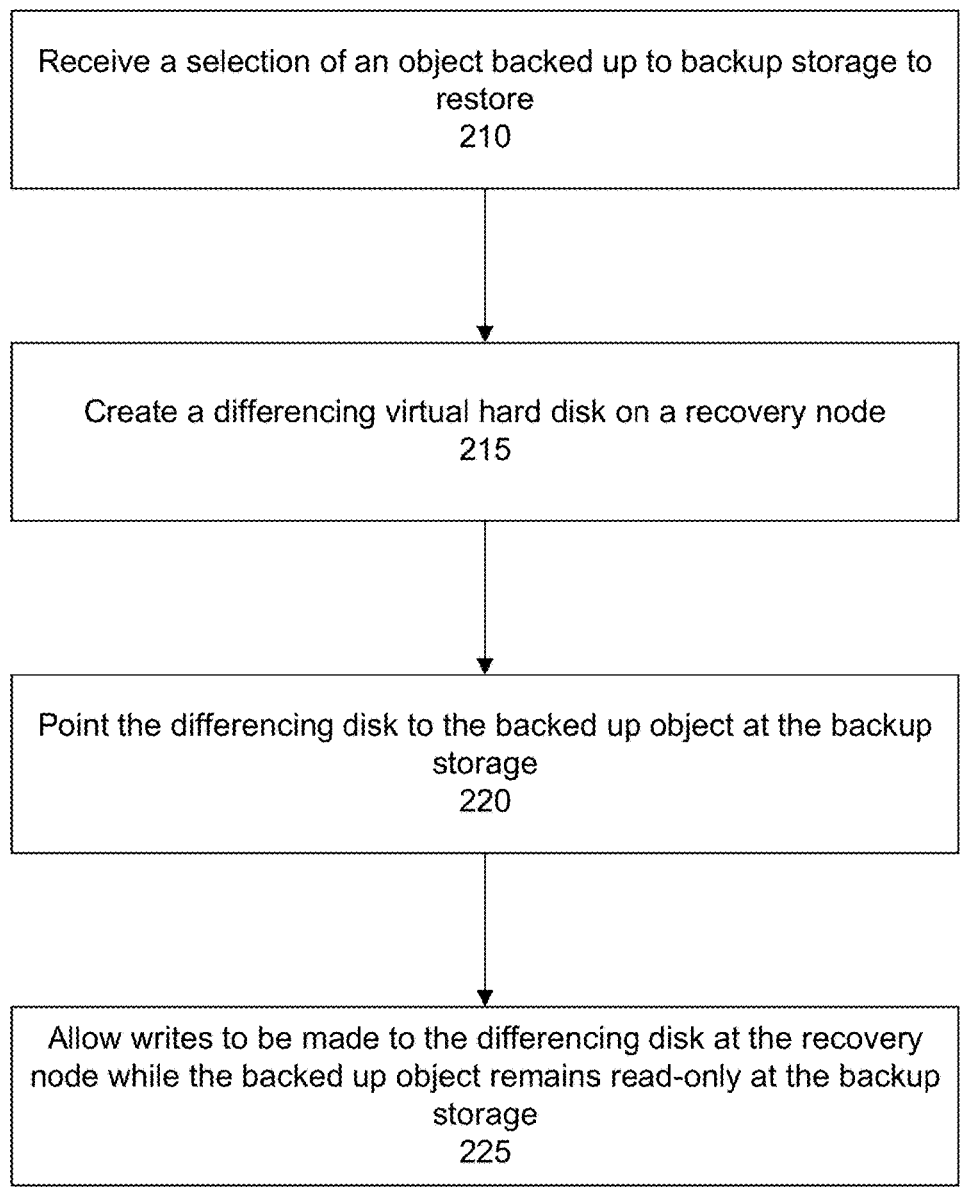
FIG. 2 shows an overall flow for recovering an object, under some embodiments.

FIG. 2 shows an overall flow of a process for quickly restoring, recovering, or starting an object that has been backed up. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 210, a backup application receives from a user, such as a backup administrator, a selection of an object backed up to a backup storage node to restore, recover, or start. In a step 215, a differencing virtual hard disk—165 (FIG. 1)—is created on the recovery node. A differencing disk is a virtual hard disk that stores changes made to another virtual hard disk or to the guest operating system. The differencing disk stores all changes that would otherwise be made to the parent disk if the differencing disk was not being used.

Referring back now to FIG. 2, in a step 220, the differencing disk is pointed 160 (FIG. 1) to the object that has been backed up to the backup storage node. The pointing may include identifying a parent virtual hard disk to be associated with the differencing virtual hard disk where the parent disk is in a read-only mode on a first device (e.g., backup storage) and the differencing disk is on a second device (e.g., recovery device), different from the first device. That is, an attribute of the parent virtual hard disk is read-only. The pointing may include updating a configuration parameter of the differencing disk with an identification and location the parent disk.

In a step 225 (FIG. 2), writes 163 (FIG. 1) are allowed to be made to the differencing disk while the backed up object remains in a read-only mode or state at the backup storage node. The full backup of the object on the backup storage node can be accessed through the differencing disk on the recovery node. The full backup of the object can remain in a read-only mode while write operations are permitted because the writes are to the differencing disk which is in a read-write mode on the recovery node. Thus, the object will appear to have been fully copied, restored, and operational at the recovery node.

In an embodiment, the backed up object is in a read-only state or mode so that the backup cannot be changed, altered, or modified. This helps to preserve the integrity of the backup and archive of the backup. Some applications, however, require writes to be permitted in order to recover or start. For example, a virtual machine that has been backed up on the backup media cannot be started because it may be in a read-only state. Furthermore, it may be difficult to test the recovery of an application if no writes are allowed.

Copying, however, the backed up object from backup storage to the recovery node (or other target or destination to recover to) can be a very time and resource intensive process—especially for applications or other objects involving large amounts of backed up data such as email servers, virtual machines, database applications (e.g., Oracle Database, Microsoft SQL Server), and the like. These applications typically include very large amounts of data to be recovered. For example, a virtual machine or an Exchange mail box may be 100 gigabytes (GB), 500 GB, or well over 500 GB in size. Transmitting such a large amount of data from the backup storage to a recovery destination requires time and can overwhelm an organization's network.

A technique of the system, however, as shown in FIG. 2 and discussed further below, allows a backed up object to be very quickly recovered. In particular, writes can be made to the differencing virtual hard disk that is at the recovery node and pointing to the backup at the backup storage node. The full backup of the object can remain at the backup storage node and in a read-only mode at the backup storage node. In other words, the full backup does not have to be copied from the backup storage node to the recovery node.

In an embodiment, an instant start refers to starting or instantiating an application at a recovery node while the full backup of data of the application remains at backup storage and not copied to the recovery node. The technique allows the backup to be very quickly started on, for example, a test machine remote or separate from backup storage and without affecting the backup because the backup remains read-only. If the application properly starts and operates as expected on the test machine, the backup can then be formally recovered and the data eventually migrated from backup storage to the production node or primary server. Any problems with the recovery can be very quickly identified during the restore test and before time and resources are expended to formally recover the backup to the production node. The differencing disks used for test purposes can be deleted. Alternatively, in an embodiment, the application can be used while the data is being migrated to a production or primary node. Any changes made during the migration can be incorporated into the resulting migration at the production or primary node.

Application data is growing in size day by day. The amount of data has created new challenges for data protection. With exponential data growth and increasingly stringent service level agreements (SLAs) traditional backup solutions cannot keep up. The amount of data has changed the backup and restore paradigm. In protecting a big data application, one of the main considerations is minimizing or reducing data movement and data copies. In an embodiment, systems and techniques of a backup application as described herein solves the data movement problem using change block tracking (CBT). With CBT, only the data block that has changed from a last backup are sent to the backup media on the secondary storage. Some examples of secondary storage include Data Domain as provided by Dell EMC or an advanced file type device (AFTD).

There are similar challenges related to the size of the data in disaster restore and performing a disaster restore test. In the case of a disaster restore or disaster restore test (DR test) a backup application copies the data from the secondary storage (e.g., backup media) to an application server (e.g., recovery node). The time required for copying the data from the secondary storage to the application server and starting an application from that data increases proportionately to the size of the data. In an embodiment, systems and techniques are described for a novel approach of an instant restore of an application. These systems and techniques can be utilized in cases of disaster or for DR testing. These systems and techniques also reduce the number of copies of the data in an enterprise.

To prove operability, a proof of concept (POC) of an instant restore of mailboxes on an Exchange Server was performed using these systems and techniques with a backup application referred to as Networker from Dell EMC. In the POC, the technology to perform the instant restore leveraged a block based backup (BBB) framework of the backup application (e.g., Networker). Provided herein is a technical overview and discussion of minimizing or reducing copies of data by starting an application instantly from its read-only files on backup media. Described herein are the technical challenges faced in POC and how they were mitigated and addressed.

As discussed, in today's world, many mission critical applications, such as SQL Server, Exchange, and so forth, run on a distributed system to ensure high availability and scalability. In these systems, the amount of data can scale from few gigabytes to a petabyte or more very quickly. To protect such a scaled-up application, in a specific embodiment, a backup application implements a change tracking filter driver in the storage stack that creates an in-memory bit map to track which file system blocks are changed from a last backup. In this specific embodiment, the backup data is saved in the virtual hard disk format (e.g., VHD or VHDx). Saving in the VHD format or in a VHD format container allows for synthesizing a full image of application data from the incremental data and last backup. This process is referred to as a synthetic full backup and it reduces the backup time for big data applications and thus facilitates maintaining a good recovery point objective (RPO). The RPO refers to a measure of the maximum time period in which data might be lost if there is a major incident affecting an IT service.

To perform a restore test or an actual restore, a user must typically copy data from the backup media to the application server. The time to copy data from secondary storage to the application server grows with the size of data and increases the RTO making it increasingly difficult to achieve the SLA objectives in cases of disaster. As discussed, to prove operability a POC was developed in which an application from read-only secondary storage was started without copying the entire backup data to the application server. Systems and techniques as described herein can help the user to achieve an instant or near-instant start of an application with near zero RTO in case of disaster. Systems and techniques as described herein also help in reducing the number of copies of the data in an enterprise.

Below are some benefits of an instant start of an application from secondary storage:

1) Immediately start an application into a production environment by running it directly from the backup file.

2) Archived data of the application remains in a read-only state to avoid unexpected modifications.

3) Finalize application recovery by live migration of application data from secondary storage by application tools.

Below are some example use cases of the instant start functionalities:

1) DR-Test
  a) No additional copy or storage
  b) Automation and self-test
2) Near zero RTO in case of disaster recovery
3) Instant restore is similar to failover in clustering with minimal tolerance for downtime.

Figure 3:
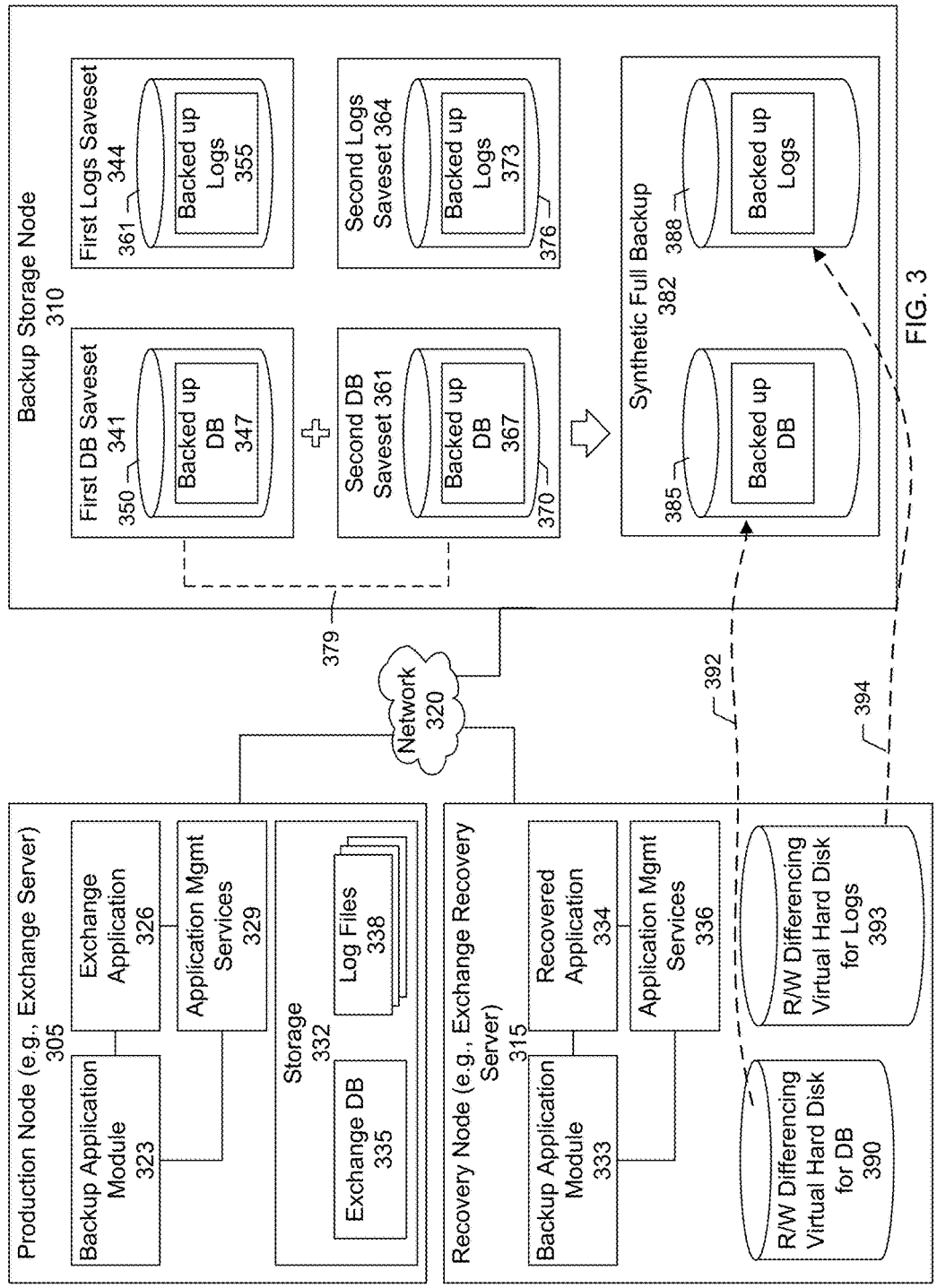
FIG. 3 shows an overall architecture of a system for backup and recovery of a big data application, according to a specific embodiment.
Figure 13:
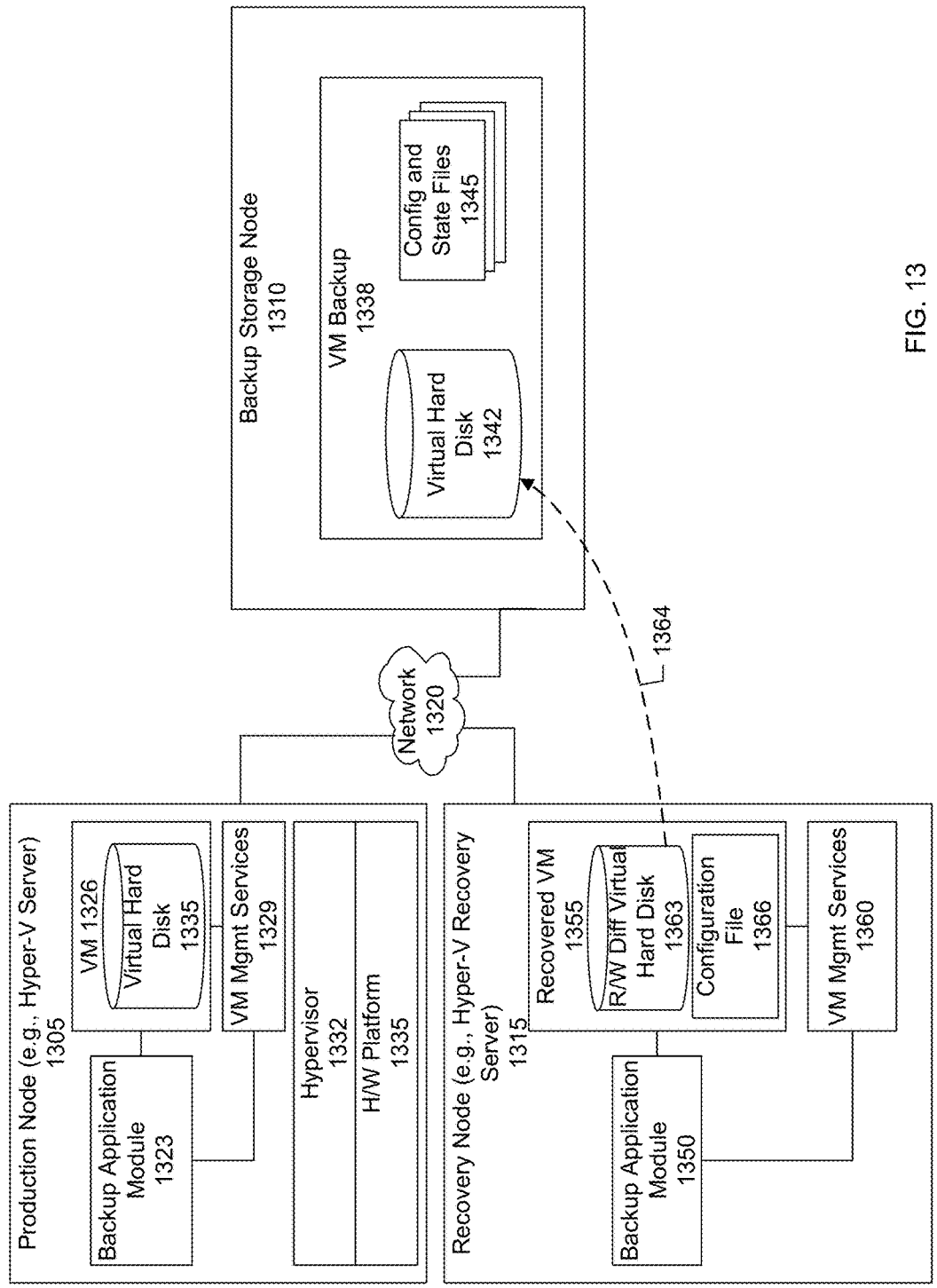
FIG. 13 shows an architectural diagram for instantly starting a backed up virtual machine, under some embodiments.

FIG. 3 shows a specific embodiment of the system shown in FIG. 1 to illustrate restoring an email server such as Microsoft Exchange. FIG. 13 shows another specific embodiment of the system shown in FIG. 1 to illustrate starting a virtual machine such as a Hyper-V virtual machine. Exchange is messaging system that may include a mail server, an email program, and groupware applications from Microsoft. Hyper-V, from Microsoft, is a virtualization platform that provides for the creation of a virtual (rather than physical) version of a computer including an operating system, storage device, and so forth. Guest software runs on the virtual machine as though it is running directly on physical hardware.

It should be appreciated that while some embodiments are shown and described in conjunction with restoring the Exchange application and starting a Microsoft Hyper-V virtual machine, aspects and principles of the system and technique can be applicable to restoring and starting other applications or objects that have been backed up (e.g., SAP applications, Lotus Notes, and so forth).

Referring now to FIG. 3, there is a production node 305 (e.g., Exchange Server), a backup storage node 310, and a recovery node 315, each of which are interconnected by a network 320. The production node includes a backup application module 323, an application 326 to be backed up, application management services 329, and storage 332. As shown in the example of FIG. 3, the recovery node (e.g., Exchange Recovery Server) includes a backup application module 333, a recovered application 334, application management services 336, and one or more differencing virtual hard disks (e.g., 390, 393) pointing to the backup at the backup storage node. A node may further include other hardware and software components such as described in the discussion accompanying FIG. 1. For example, a node may include memory, a processor, network interface, and so forth.

Depending on the object that has been backed up, data associated with the backed up object may be stored in one or more containers formatted as virtual hard disk files. Thus, for a restore there can be multiple (e.g., two or more) differencing disks at the recovery node pointing to their corresponding virtual hard disk containers at the backup storage so that the object can be properly restored at the recovery node.

In the example shown in FIG. 3, the application includes Exchange and the production node may be referred to as an Exchange Server. Exchange, similar to other database applications, includes a database 335 and log files 338. The database may include an Exchange database file (e.g., a file having the ".edb" file extension).

Data, such as an email received at the Exchange server, may first be written from memory to a log file. Exchange may pre-allocate or pre-determine a size for the log files (e.g., 1 megabyte (MB)). When a size of a current log file reaches the pre-determined size, Exchange may create a new log file. The log files are then committed to the database. That is, the data stored in the log files are written to or incorporated into the database. The writing of data in a log file to the database may occur during an idle machine cycle such as during off-peak times so that computing resources of the server can be devoted to other tasks during peak times. Thus, at any given time there can be multiple, e.g., two or more, log files. For example, there can be 2, 5, 10, 20, 30, 40, 50, or more than 50 log files.

The backup application module may interface with the application management services to coordinate the backup and recovery of the application. For example, application management services may include a snapshot copy service to help pause the application, bring the application to a consistent state, generate a snapshot of the application, and thaw the application so that IO can continue. The backup application may then backup the application by copying from the snapshot to the backup storage node. An example of a copy service includes volume shadow copy (VSS). Another example of an application service includes Microsoft PowerShell. PowerShell is an object-oriented programming language and interactive command line shell for Microsoft Windows.

As shown in the example of FIG. 3, the backup storage node includes a first database saveset 341 and a first logs saveset 344. The first database saveset includes a full backup of a database 347 (e.g., Exchange database file or .edb file) corresponding to the database on the production node. The database is placed or put into a first container 350 or first virtual hard disk. A size of the first container may be equal to a size of the database so that storage space on backup storage is used efficiently. The first logs saveset includes a full backup of logs 355 corresponding to the logs on the production node. The logs are placed or put in a second container or second virtual hard disk 361. Similarly, a size of the second container may be equal to a size of the logs files.

In an embodiment, the backup application provides support for incremental backups and synthesizing a full backup on the backup storage node by merging a previous full backup and one or more incremental backups made after the previous backup.

In an embodiment, the production nodes includes a change block tracking (CBT) driver. The CBT driver is responsible for tracking changes to one or more particular files as of a last backup of the files. The CBT driver can track changes at the file or file block-level. Tracking changes at the file or file block-level provides a more granular process than tracking changes at the volume-level. Specifically, tracking changes at the file-level allows for an incremental backup of a particular file—and, more specifically, blocks of the file that have changed since a last backup—without having to backup other files on the volume, regardless of whether or not they have changed, and without having to backup other portions of the particular file that have not changed since the last backup. The backup module coordinates with the application management services (e.g., VSS) and the CBT driver to backup the database and log files associated with the database to the backup storage node.

Storing the backed up database separate from the backed up log files in separate containers or virtual hard disks on the backup storage node helps to facilitate generating a synthetic full backup of the database. A synthetic full backup refers to creating a full backup on the backend (e.g., backup storage node) by merging a parent virtual hard disk corresponding to a full backup and one or more child virtual hard disks corresponding to one or more incremental backups.

Synthesizing full backups from incremental backups helps to facilitate good recovery time objectives (RTO). For example, over time there may be an increasing number of incremental backups stored on the backup media. These incremental backups are dependent on previous backups and cannot be recovered separately or without the previous backup copy. The number of incremental backups is inversely proportional to recovery performance. Thus, as the number of incremental backups increases the restore performance decreases. Further, managing many separate incremental backups in the media (e.g., managing retention periods and expiration times and dates) can be very cumbersome.

For example, after a first backup of the application, changes to the application are tracked. These changes may then be backed up to the backup storage node during an incremental backup. Data that has not changed from the previous backup may be excluded from the incremental backup. In the example shown in FIG. 3, there is a second database saveset 361 and a second logs saveset 364. The second database saveset includes an incremental backup 367 corresponding to the changes of the database on the production node since the last backup. The incremental database backup is placed into a third container 370 or third virtual hard disk. There is a second logs save set that includes logs 373 corresponding to the logs on the production node. The logs are placed in a fourth container or fourth virtual hard disk 376.

The incremental backup is chained or linked 379 to the previous backup (e.g., previous full or incremental backup). In other words, the backup application can associate the child container with the parent through incremental chaining.

In the example shown in FIG. 3, a synthetic full backup 382 has been artificially created at the backup storage node based on the full and incremental backups. The synthetic full backup includes a fifth container or virtual hard disk 385 and a sixth container or virtual hard disk 388 storing a result of the merging.

In other words, in a specific embodiment, the backup application implements a change tracking filter driver in the storage stack that creates an in-memory bit map to track which file system blocks are changed from a last backup. In this specific embodiment, the backup data is embedded in a virtual hard disk (VHD) container which is archived on backup media. The VHD disk creates a parent-child relationship. The VHD format helps to facilitate synthesizing a full image of application data from the incremental data and last backup. The process may be referred to as a synthetic full backup. Synthetic full backups reduce the backup time—especially for big data applications—and thus provide for good recovery point objectives (RPO).

Since, in this example, the backup includes two VHD containers (a VHD container for the database and a VHD container for the logs), the recovery node likewise includes two differencing VHDs. Specifically, there is a differencing VHD 390 for the database pointing 392 to the VHD container storing the database. There is a differencing VHD 393 for the logs pointing 394 to the VHD container storing the logs. The VHD containers having the database and logs remain read-only while the differencing disks for the database and logs are in a read/write mode. Thus, when the application is recovered at the recovery node, the application can be fully functional. For example, write operations may be issued which may then be stored to the differencing disk for the logs. The logs may then be committed and updates to the database may be stored in the differencing disk for the database.

Figure 4:
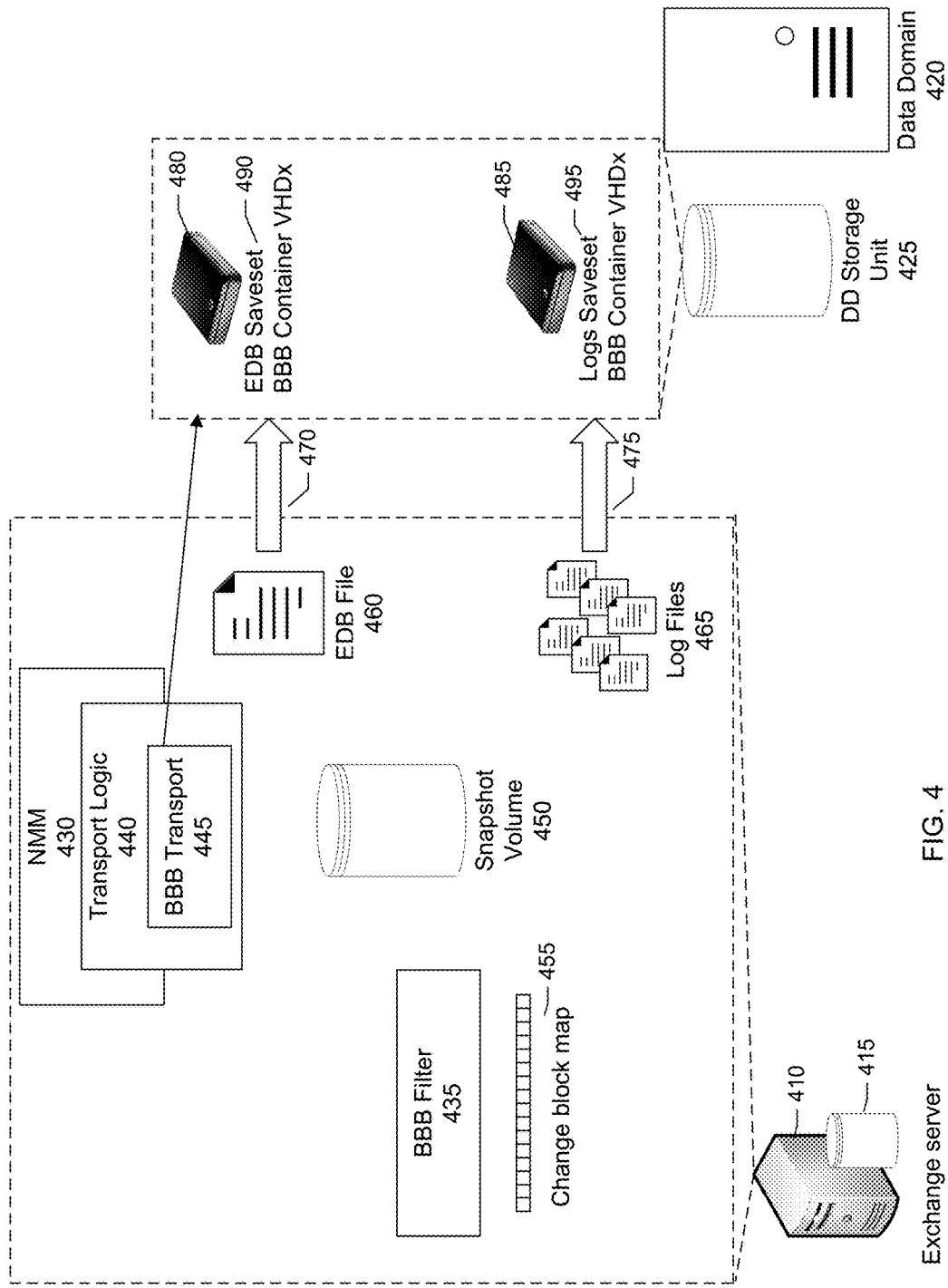
FIG. 4 shows a block diagram of a full backup, under some embodiments.
Figure 5:
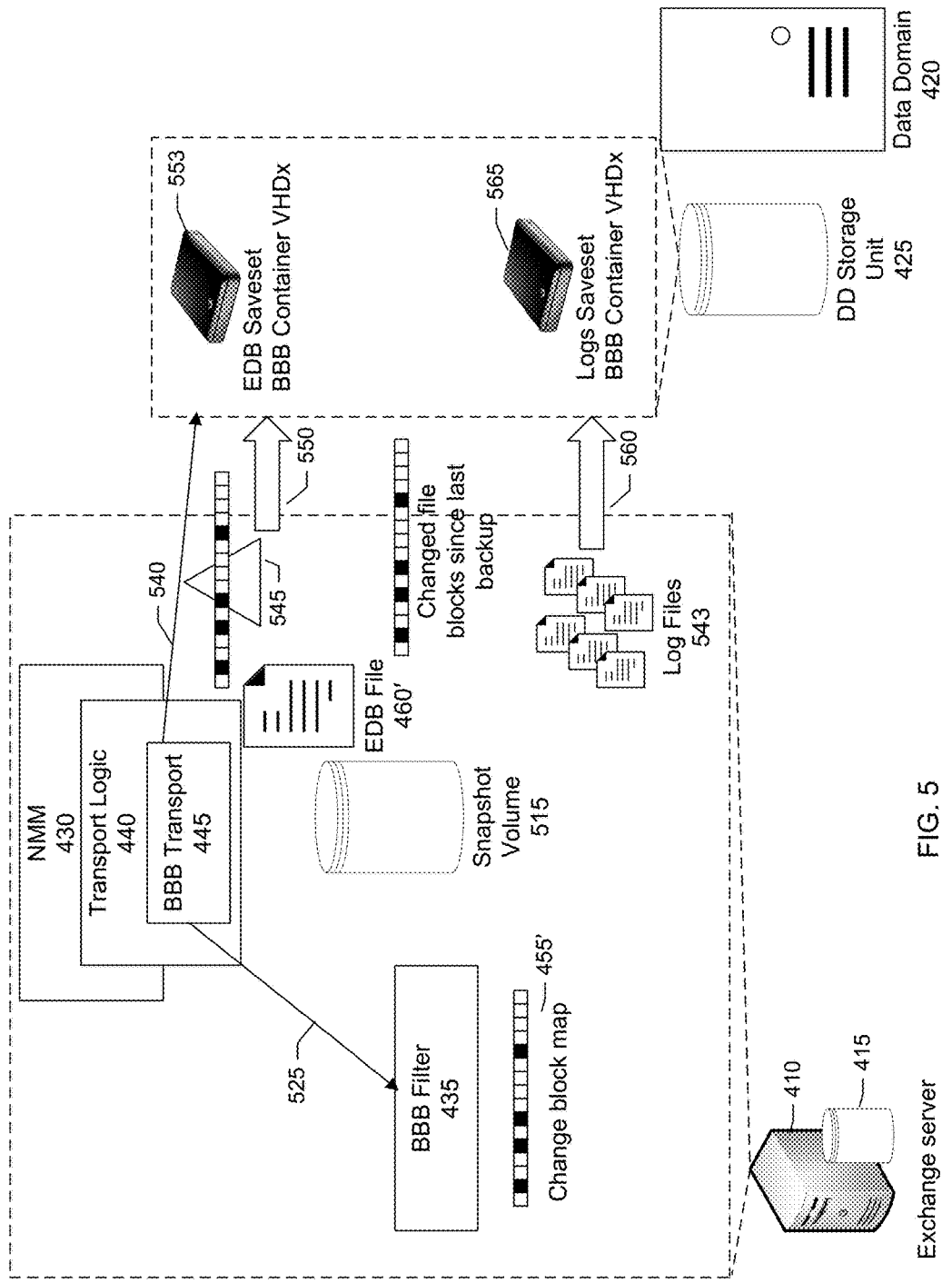
FIG. 5 shows a block diagram of an incremental backup, under some embodiments.

FIGS. 4-5 show examples of a full and incremental backup, respectively. In this specific embodiment, the database includes an Exchange database, the production node to be backed up is an Exchange Server, the changed block tracking driver is referred to as a block-based backup (BBB) filter driver, the backup module is referred to as the NetWorker Module for Microsoft (NMM) by Dell EMC, and the backup storage node includes the Data Domain system and Data Domain Storage Unit by Dell EMC. It should be appreciated that these products are mere examples of specific applications, storage devices, and so forth. The systems and techniques can be applicable to other applications and storage devices.

As shown in the example of FIG. 4, there is an Exchange server 410 having an Exchange database 415. There is a Data Domain storage node 420 having a Data Domain storage unit 425. A backup module or agent (e.g., NMM) 430 and changed or block-based backup (BBB) filter driver 435 is installed at the Exchange server. NMM includes transport logic 440. The transport logic includes a BBB transport module 445.

When a backup of the Exchange database is to be performed, NMM coordinates with the copy service (e.g., VSS) on the Exchange server to obtain a snapshot 450 of the volume storing the Exchange database. Upon completion of the snapshot, the BBB filter driver starts writing tracking in order to capture subsequent changes to the database for a next backup of the database. In particular, the BBB filter driver maintains a change block map 455 that tracks changes to a file block associated with the particular file that was registered by the backup agent for change tracking.

The backup agent (NMM), or more particularly the BBB transport module, is responsible for reading from the snapshot volume an Exchange database file 460 and associated log files 465, and transmitting 470, 475 the database and log files to the backup storage node. The BBB transport module is further responsible for creating on the backup storage node a first container (e.g., first virtual hard disk or first VHDx) 480 and a second container (e.g., second virtual hard disk or second VHDx) 485, and partitioning and formatting the volumes. The BBT transport module copies complete contents of Exchange EDB file 460 from snapshot 450 to first container or VHDx 480.

Similarly, the BBB transport module copies the log files 465 from snapshot 450 to second container or VHDx 485, which is separate from first container or VHDx 480. As discussed above, the backups may be organized into savesets. For example, as shown in FIG. 4, there can be a database or EDB saveset 490 associated with the first container for the database. There can be a logs saveset 495 associated with second container for the log files associated with the database.

FIG. 5 shows a block diagram of an incremental backup of a database according to a specific embodiment. In this specific embodiment, the database includes an Exchange database. FIG. 5 is similar to FIG. 4. FIG. 4, however, shows a full backup. A full backup may be referred to as a level 0 backup. FIG. 5 shows an example of an incremental backup that may follow the full backup shown in FIG. 4.

Referring now to FIG. 5, backup agent (e.g., NMM) 430 installed at Exchange server 410 obtains or receives a snapshot volume 515 of the Exchange server. The agent obtains or receives 525 a list of changed file blocks for an Exchange (e.g., *.edb) file 460' on the snapshot from changed block or block-based backup (BBB) filter driver 435. Exchange database file 460' (FIG. 5) corresponds to Exchange database file 460 (FIG. 4) and represents the changes made to the database after the backup shown in FIG. 4. As discussed, the filter driver maintains a change block map. The map tracks which blocks of a particular file registered with the filter driver that have changed since a last backup of the particular file. In FIG. 5, the changed blocks for the Exchange EDB file are shown as solid black-filled squares in a change block map 455'. Change block map 455' (FIG. 5) corresponds to change block map 455 (FIG. 4). The map shown in FIG. 5, however, has been updated to show the file blocks of the Exchange database file that have changed since the backup shown in FIG. 4.

The backup agent coordinates 540 with storage node 420 to backup changed file blocks 545 and a new set of log files 543 to storage unit 425 of the storage node. In particular, changed file blocks 545 of the Exchange database file are transmitted 550 from the snapshot volume on the Exchange server to the storage unit. The changed file blocks may be organized into a saveset (identified in FIG. 5 as an "EDB saveset") and are stored in a third container 553 created on the backup storage node or unit. In a specific embodiment, the third container is a virtual hard disk file or, more specifically, a differencing virtual hard disk file.

New set of log files 543 are transmitted 560 from the snapshot volume on the Exchange server to the storage unit. The new set of log files may be organized into another saveset (identified in FIG. 5 as "logs saveset") and are stored in a fourth container 565 created on the backup storage node or unit, separate from the third container. The fourth container stores a full backup of the new set of log files. In a specific embodiment, the fourth container is a virtual hard disk file.

In other words, during an incremental backup of a database file, the storage node receives a set of changed file blocks, and set of log files. The changed file blocks correspond to changes to the database file since a last backup of the database file. The set of log files may store data not yet committed to the database. In an embodiment, BBB transport creates a new full (level 0) container for the logs saveset since logs change with each backup.

Figure 6:
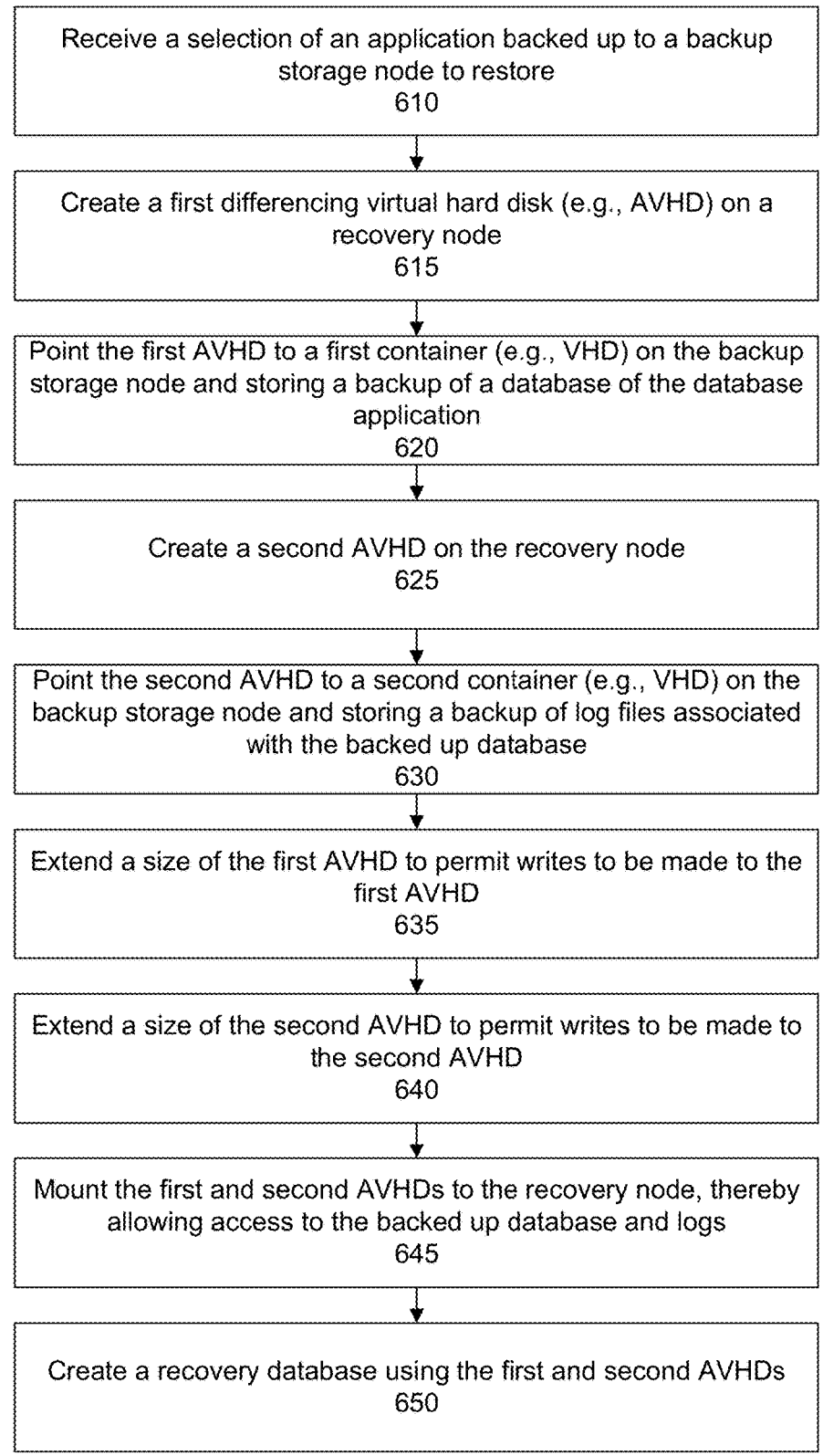
FIG. 6 shows a flow for recovering a big data application, under some embodiments.

FIG. 6 shows a flow for reducing the amount of time to restore a big data application. The big data application may include a database. In a step 610, the system receives a selection of an application backed up to a backup storage node to restore. For example, the backup management console may present or cause the display of a GUI to the backup administrator. The GUI may include a listing of applications that have been backed up. The backup administrator can browse the listing and select (e.g., using a pointing device such as a mouse) an application to recover. Instead or additionally, there can be a command line interface, application programming interface (API), or both through which a selection may be received.

In a step 615, a first differencing virtual hard disk (e.g., AVHD) is created on a recovery node. As discussed, the recovery node may be the same as or a different machine from where the application was backed up. For example, in some cases, an administrator may wish to test the recovery of a backed up application. Thus, rather than restoring the application to a production node from which the application was originally backed up, the administrator may recover the application to a test machine. Alternatively, in cases where, for example, the production node has suffered a disaster or other failure, the administrator may recover the application to the production node. Thus, in this case, the AVHD may be created on the production node.

In a step 620, the first AVHD is pointed to a first container (e.g., VHD) on the backup storage node that stores a backup of a database of the application. For example, the backup application module may cause the creation of a first link, chain, relationship, or other association between the first AVHD and the first VHD container having the backup of the database. The relationship may be a parent-child relationship, the first AVHD being a child in the relationship and the first VHD container being a parent in the relationship. The first VHD container may be referred to as a first base disk. Information may be saved or stored to a data structure indicating the relationship.

In a step 625, a second AVHD is created on the recovery node (or other node to which the backup is to be restored). The second AVHD is different from the first AVHD. In a step 630, the second AVHD is pointed to a second container (e.g., VHD) on the backup storage node that stores a backup of log files associated with the backed up database. For example, in a manner similar to the linking of the first VHD to the first container, the backup module may cause the creation of a second link, chain, relationship, or other association between the second AVHD and the second VHD container having the backup of the database log files. The relationship may be a parent-child relationship, the second AVHD being a child in the relationship and the second VHD container being a parent in the relationship. The second VHD container may be referred to as a second base disk.

Figure 7:
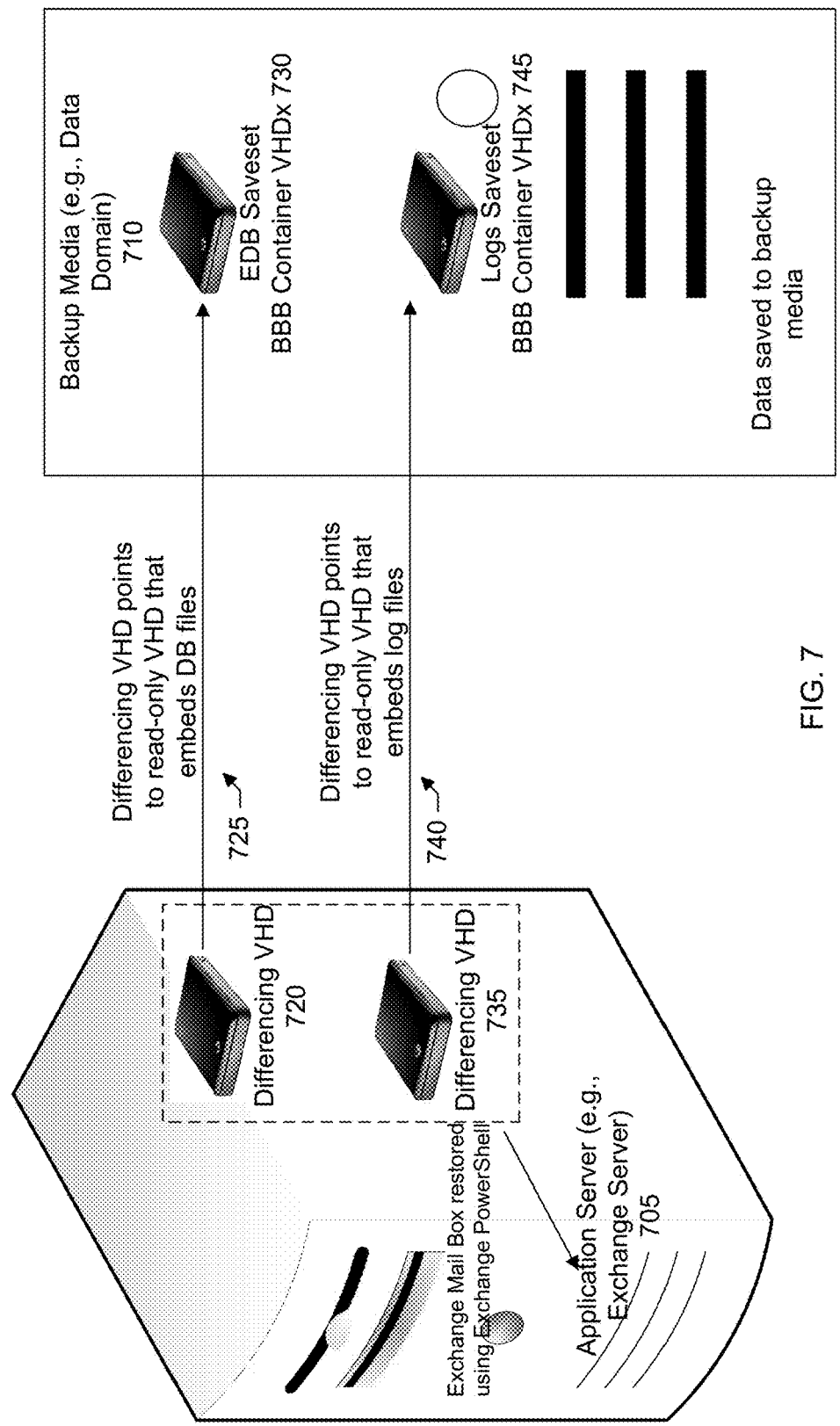
FIG. 7 shows a block diagram for recovering a big data application, under some embodiments.

Referring now to FIG. 7 as a further example, there is shown an Exchange server 705 and a backup media 710. In this example, the backup media stores a backup of the Exchange application which is to be restored to the Exchange server. A first differencing VHD 720 is created on the Exchange server (step 615, FIG. 6). The first differencing VHD is pointed 725 to a first read-only VHD 730 on the backup media that has embedded within the Exchange database files (step 620, FIG. 6).

A second differencing VHD 735 is also created on the Exchange server (step 625, FIG. 6). The second differencing VHD is pointed 740 to a second read-only VHD 745 that embeds the backed up log files associated with the Exchange database (step 630, FIG. 6).

Figure 8:
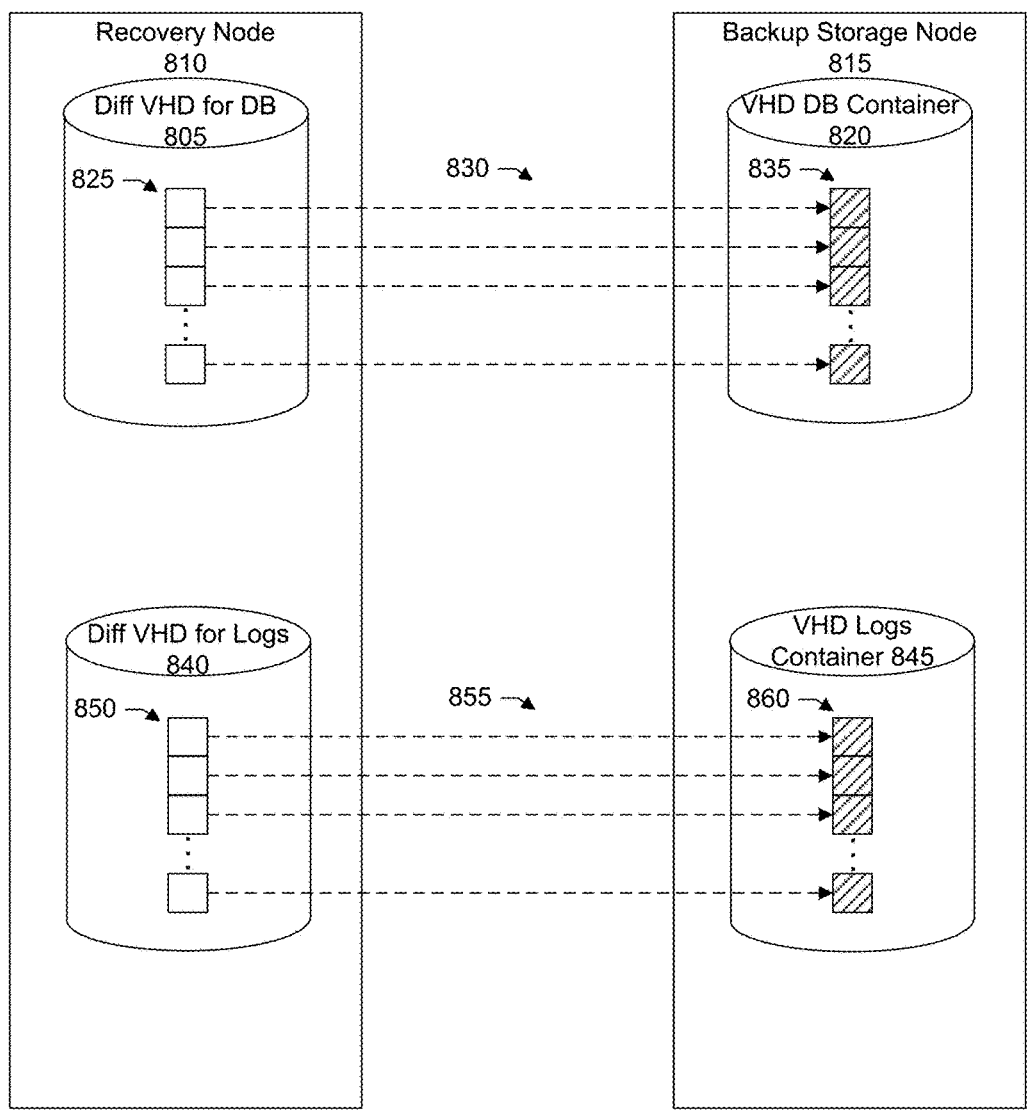
FIG. 8 shows an example of a differencing disk and parent disk, under some embodiments.

Referring back now to FIG. 6, in a step 635, the backup application module extends a size of the first AVHD. For example, in an embodiment, the module may issue an instruction or request to extend the size to a service that manages a configuration of the disk. The extending of the size permits writes to be made to the first AVHD while the first VHD container having the backed up database remains in a read-only mode. FIG. 8 shows an example of a differencing virtual hard disk 805 on a recovery node 810 pointing to a parent virtual hard disk 820 having the backed up database (e.g., Exchange database or .edb file) on a backup storage node 815. Disk 805 is shown in FIG. 8 as being in a first state after its creation on the recovery node 810.

After creation, the differencing virtual hard disk includes a set of blocks 825. The blocks point 830 or include references or pointers to a corresponding set of blocks 835 on the parent virtual hard disk. The parent disk includes the actual data content of the database as indicated by the fill pattern in blocks 835 of parent VHD container 820. Thus, in an embodiment, there is a one-to-one mapping between the blocks between the differencing and parent disks and the differencing disk is expanded to allow writes to be made.

Figure 9:
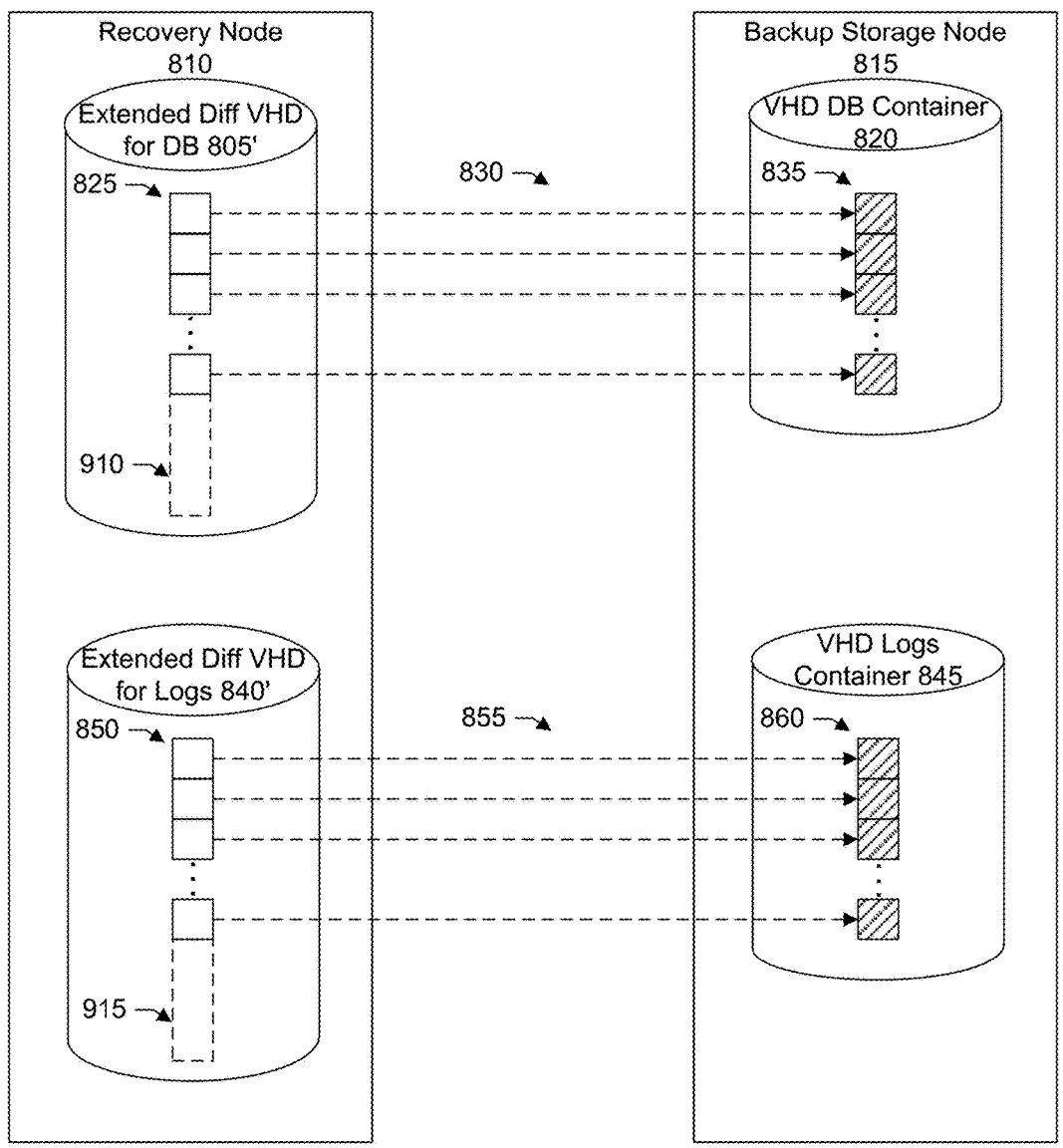
FIG. 9 shows an example of a differencing disk being extended in size, under some embodiments.

FIG. 9 shows a differencing virtual hard disk 805', corresponding to disk 805 in FIG. 8, and showing the differencing disk in a second state after the operation to increase the size (step 635, FIG. 6). As shown in the example of FIG. 9, a size of the disk has been extended as shown by a box of broken lines 910.

Referring back now to FIG. 6, in an embodiment, a similar operation to expand or extend the size of the differencing virtual hard disk may be performed to the disk for storing write operations to the logs (step 640).

For example, referring now to FIG. 8, there is a differencing virtual hard disk 840 on the recovery node pointing to a parent virtual hard disk 845 having the backed up logs associated with the backed up database on the backup storage node. Differencing disk 840 is shown in FIG. 8 as being in a first state after its creation on the recovery node.

After creation, differencing disk 840 includes a set of blocks 850. The blocks point 855 or include references or pointers to a corresponding set of blocks 860 on the parent virtual hard disk. The parent disk includes the actual data content of the logs as indicated by the fill pattern in blocks 860 of parent VHD container 845.

FIG. 9 shows a differencing virtual hard disk 840', corresponding to disk 840 in FIG. 8, in a second state after the operation to increase the size (step 640, FIG. 6). As shown in the example of FIG. 9, a size of the disk has been extended as shown by a box of broken lines 915.

As shown in FIG. 8, differencing VHDs may, by default, be created with the size of the actual or parent VHD and thus may not include free space for write operations. In some cases, while a differencing disk may be allowed to dynamically expand, the parent can be a fixed size VHD and the differencing VHD will be dynamically expanding. But, there can be limits. A dynamically expanding differencing VHD may not grow infinitely. By default, the differencing disk may expand up to the size of its parent. Thus, by setting a limit or extending the size of a differencing disk (steps 635, 640, FIG. 6), there will be free space for writes to be made to the differencing disk.

Referring back now to FIG. 6, in a step 645, the first and second differencing disks (e.g., first differencing disk pointing to backed up database and second differencing disk pointed to the backed up log files) are mounted at the recovery node. The mounting allows access to the backed up database and logs on the backup storage node from the recovery node without having to copy the full backup to the recover node.

In a step 650, a recovery database may be created. The recovery may involve the first and second differencing disks.

In an embodiment, the recovery database (RDB) is a type of mailbox database that allows the mounting of a restored mailbox database and extraction of data from the restored database as part of a recovery operation. For example, some applications, such as Exchange, use a recovery database as an intermediate step in performing a recovery. Thus, in an embodiment, the recovery database may be deleted after testing a backup. In an embodiment, the recovery database is created using or by relying on the first and second differencing disks which have been pointed to the parent disks on backup storage. The backup data stored at backup storage can be accessed through the differencing disks. Thus, the backup data does not have to be copied from backup storage.

Figure 10:
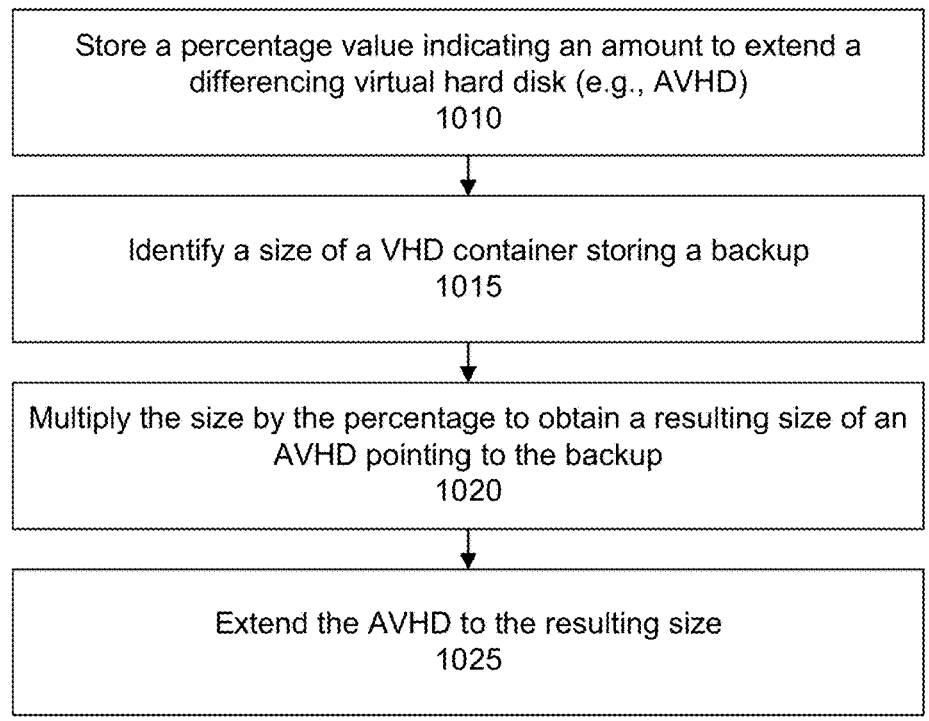
FIG. 10 shows a flow for increasing a size of the differencing disk, under some embodiments.

The differencing disks may be extended by any amount. In a specific embodiment, a differencing disk may be extended by a percentage value. FIG. 10 shows a flow for extending a differencing disk based on a percentage value. In a step 1010, a percentage value is stored indicating a percentage amount to extend a size of a differencing virtual hard disk. In an embodiment, the percent may range from about 5 percent to about 15 percent. The percent may be less than 5 percent or greater than 15 percent. In a step 1015, a size of a virtual hard disk container storing a backup is identified. In a step 1020, the size is multiplied by the percentage value to obtain a resulting size of a differencing virtual hard disk pointing to the backup. In a step 1025, the differencing virtual hard disk is extended to the resulting size.

Consider, as an example, that the percentage value is 10 percent and a size of the VHD parent backup disk is 100 GB. The amount to increase the differencing disk is 10 GB (100 GB×10 percent=10 GB). Thus, the differencing disk would be extended to 110 GB (100 GB plus 10 GB=110 GB). Consider, as another example, that the percentage value is 10 percent and a size of the VHD parent backup disk is 200 GB. The amount to increase the differencing disk is 20 GB (200 GB×10 percent=20 GB). The differencing disk would thus be extended to 220 GB (200 GB plus 20 GB=220 GB). Thus, the amount by which to extend the differencing disk may vary. Extending using a percentage value may be based on an assumption that a large parent disk may be subject to more write operations as compared to a smaller sized parent disk.

Figure 11:
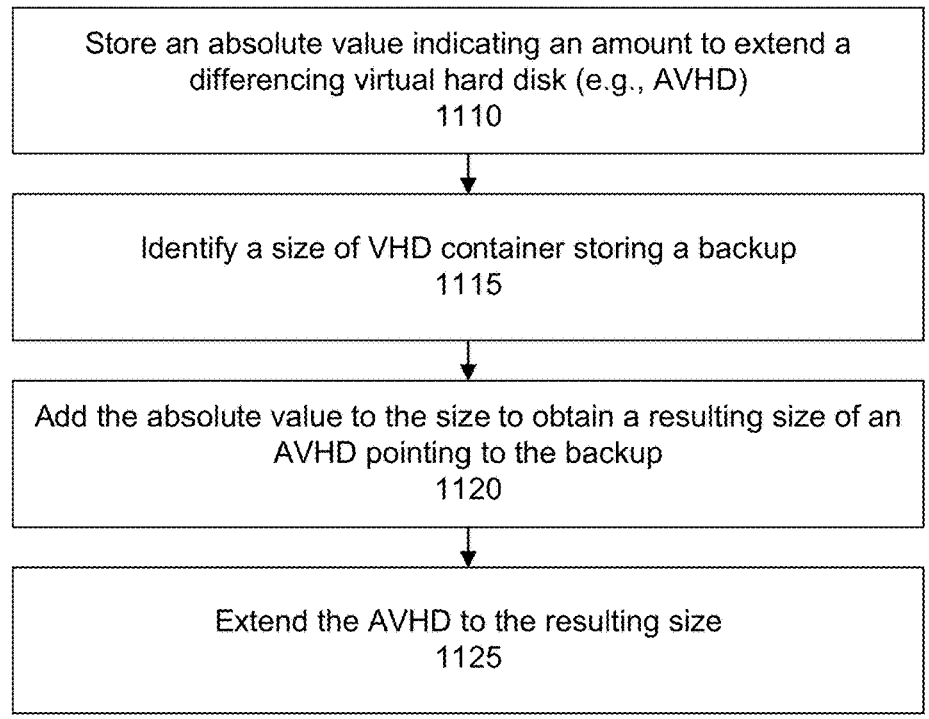
FIG. 11 shows another flow for increasing the size of the differencing disk, under some embodiments.

This not necessarily, however, always the case. Thus, in another specific embodiment, a differencing disk may be extended by an absolute value. For example, a differencing disk may be expanded by 1 GB or any other value as desired. FIG. 11 shows a flow for extending a differencing disk by an absolute value. In a step 1110, an absolute value is stored indicating an absolute amount to extend a size of a differencing virtual hard disk. In a step 1115, a size of a virtual hard disk parent container storing a backup is identified. In a step 1120, the absolute value is added to the size of the parent disk to obtain a resulting size of the differencing disk. In a step 1125, the differencing disk is extended to the resulting size.

The amount by which a differencing disk should be extended may be based on any number of parameters or combination of parameters. For example, in a specific embodiment, the amount is based on a specific application, specific application type, type of backup data stored in the virtual disk container (e.g., database file versus log file), computing resources available, expected number or size of write operations to be made, expected length of time that the recovered object or application will be running, or combinations of these. For example, if the backup administrator anticipates many large write operations to be made the backup administrator may expand the differencing disk by a relatively large amount. If, however, the administrator anticipates relatively few or small write operations to be made the administrator may expand the differencing disk by a relatively smaller amount.

Different extension amounts may be used for different applications or application types. In this specific embodiment, the system may store a first value and a second value, different from the first value. The first value indicates an amount by which to extend a differencing disk for recovering a backup of a first application (e.g., Exchange). The second value indicates an amount by which to extend a differencing disk for a backup of a second application (e.g., SQL Server), different from the first application. For example, the backup administrator may determine that larger write operations are more likely with the recovery of a particular application as compared to another application. Thus, the former application may be associated with a first value to extend a differencing disk and the latter application may be associated with a second value to extend a differencing disk where the first value is greater than the second value. That is, the second value is less than the first value.

In another specific embodiment, the amount by which a differencing disk should be extended may be based on a ratio of a size of the backed up database to a size of the backed up logs files associated with the database (or vice-versa). For example, in cases where the application to be restored involves a database application, it may be that the size of the log files can be quite large as they store transactional data. The size of the log files may increase at a rate faster than the size of the database. Thus, an administrator may wish to extend the size of a differencing disk for the log files of a database by an amount greater than an extension amount of a differencing disk for the database. Using a ratio allows the backup administrator to extend the differencing disks for a backup of a database and log files associated with the database based on a size relationship between the database and log files.

Figure 12:
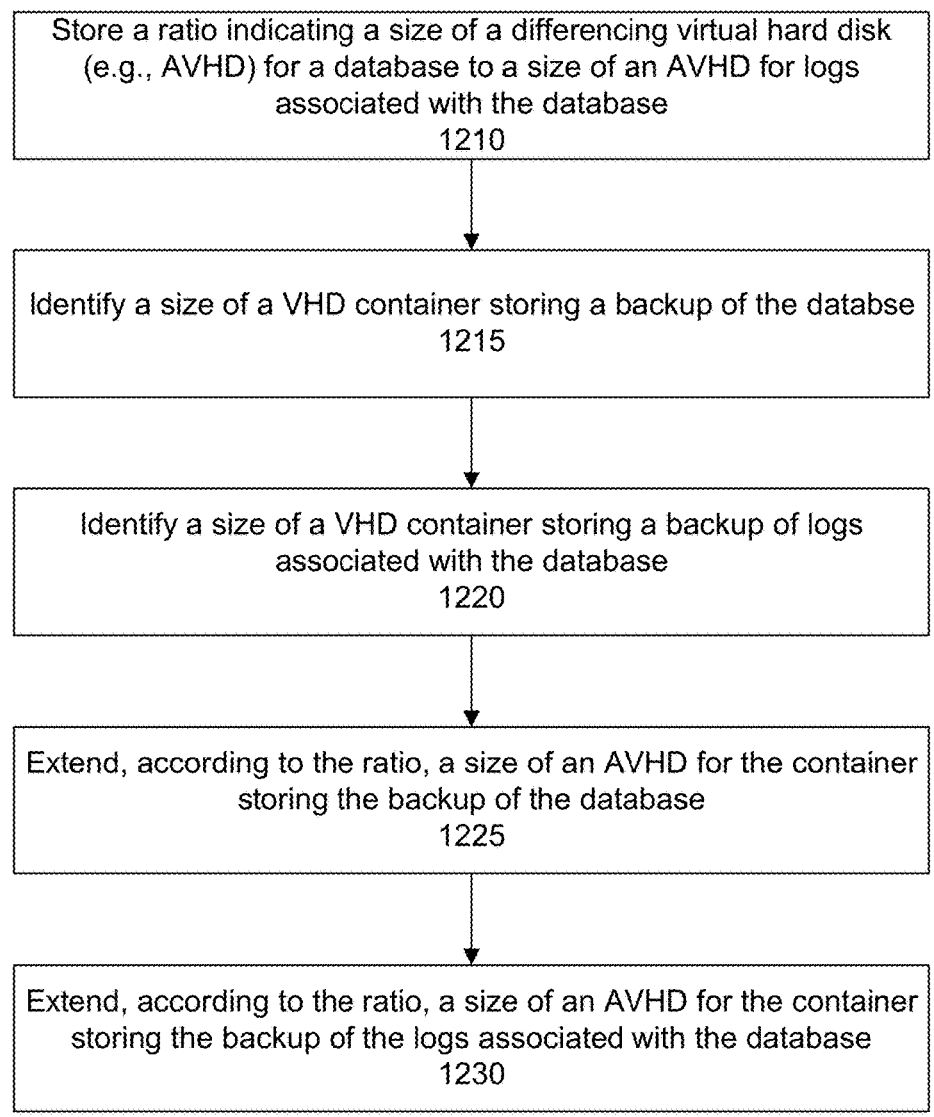
FIG. 12 shows another flow for increasing the size of the differencing disk, under some embodiments.

FIG. 12 shows an example of a flow for extending based on a ratio. In a step 1210, a ratio is stored indicating a size of a differencing virtual hard disk for a database to a differencing virtual hard disk for log files associated with the database.

In a step 1215, a size of a VHD container storing a backup of the database is identified. In a step 1220, a size of a VHD container storing a backup of logs associated with the database is identified. In a step 1225, a size of a differencing disk for the VHD container storing the database backup is extended according to the ratio. In a step 1230, a size of a differencing disk for the VHD container storing the logs backup is extended according to the ratio. Consider, as an example that the ratio is 1:1.5. If the differencing disk storing the database backup is extended by 10 GB then the differencing disk storing the logs backup is extended by 15 GB (e.g., 10 GB×1.5=15 GB).

Options such as the amount by which a differencing disk should be extended, whether to use a ratio, values for the ratio, whether to use an absolute value, whether to use a percentage value, whether the amount should vary based on application, and so forth may be user-configurable. For example, the system may prompt the backup administrator to input a value indicating the amount by which a differencing virtual hard disk should be extended. The system receives the value and adjusts a size of a differencing disk in response to the value.

In a specific embodiment, setting the amount by which a differencing disk is to be increased is performed during an initial configuration process. For example, the backup administrator may configure or set the value before any requests to instantly restore a backup have been received. When there is a request for an instant restore, the backup application module examines the preset value by which the differencing disk should be increased and, after the differencing disk has been created, automatically increases the size of the differencing disk based on the value preset by the administrator during the initial configuration.

In another specific embodiment, setting the amount by which the differencing disk is to be increased occurs during the instant restore process. For example, in this specific embodiment, after the backup administrator has made a selection of a backup to instantly restore, the backup application module may prompt the administrator for a value indicating an amount by which to increase a size of the differencing disk. There can be a default value (e.g., 2 GB or 10 percent). The backup administrator is able to override the default value and input a different value (e.g., 3 GB or 15 percent).

This granular level of control allows backup administrators great flexibility in configuring their recovery environments. For example, some administrators may wish to set the value as part of an initial configuration process in order to simplify the instant restore process. Alternatively, other administrators may desire finer control over the size of the differencing disk with respect to specific recoveries. For example, if an application is to be restored for testing purposes, the administrator may wish to extend the differencing disk by a relatively small amount as the test recovery node may lack the computing resources of the production node and the expected volume or number of writes at the test machine may be less than at the production machine.

As discussed above, this novel approach of instant restore of an application in case of disaster or for DR testing was implemented as a proof of concept (POC) and successfully tested. The POC included an instant restore of mailboxes on an Exchange Server using a backup application referred to as Networker from Dell EMC. The technology to perform the instant restore leveraged a Block Based Backup (BBB) framework of Networker.

Table A below shows a procedure of the restore as implemented in the POC.

TABLE A

| Step | Description |
|---|---|
| 1 | User chooses the Exchange Mail Box for instant restore from Networker Module for Microsoft (NMM) GUI. |
| 2 | NMM creates a differencing virtual hard disk on test machine (physical or virtual) that points to the read only virtual hard disk (VHD) of the backed up Exchange Mail Box on the backup media (e.g., Data Domain). |
| 2a | One differencing VHD file is created for the Mail Box Databases (EDB). |
| 2b | Second differencing VHD file is created for the Mail Box Log Files. |
| 3 | The differencing VHDs are (by default) created with the size of actual VHD and do not contain free space for write operations. |
| 4 | The differencing VHDs are extended in size for performing write operations to them. |
| 5 | The differencing VHDs are mounted that makes the backed up files accessible from the test machine without copying them. |
| 6 | NMM executes Exchange PowerShell query to create a recovery database with the files from the backed up media. |

Table B below shows commands and resulting output from the POC for creating differencing VHDs on a test machine that point to the read-only VHDs on the backup media. The read-only VHDs contain Exchange database and logs that are backed up.

TABLE B

PS C:\Users\administrator.AV>diskpart
Microsoft DiskPart version 6.2.9200
Copyright (C) 1999-2012 Microsoft Corporation.
On computer: AVB107
DISKPART>create vdisk file=c:\POC\DataBaseFiles.vhdx parent=\\nmmda243\StorageDevice\28\99\f0af2026-00000006-8bb4f51e-56b4f51e-00770c00-87fd8c29.vhdx
100 percent completed
DiskPart successfully created the virtual disk file.
DISKPART>create vdisk file=c:\POC\LogFiles.vhdx parent=\\nmmda243\StorageDevice\26\00\88cc41b4-00000006-8ab4f530-56b4f530-00780c00-87fd8c29.vhdx
100 percent completed
DiskPart successfully created the virtual disk file.

According to the sample data shown in Table B above, a first differencing disk named "DataBaseFiles.vhdx" for the database has been created at "c:\POC\." A first parent of the first differencing disk has been identified as "=\\nmmda243\StorageDevice\28\99\f0af2026-00000006-8bb4f51e-56b4f51e-00770c00-87fd8c29.vhdx." Likewise, a second differencing disk named "LogFiles.vhdx" for the logs has been created at "c:\POC\." A second parent of the second differencing disk has been identified as "=\\nmmda243\StorageDevice\26\00\88cc41b4-00000006-8ab4f530-56b4f530-00780c00-87fd8c29.vhdx."

Table C below shows commands and resulting output from the POC for expanding the differencing VHD in size.

TABLE C

Attaching the VHD container for Log Files:
DISKPART> select vdisk file=c:\POC\LogFiles.vhdx
DiskPart successfully selected the virtual disk file.
DISKPART> attach vdisk
100 percent completed
DiskPart successfully attached the virtual disk file.
Expanding the VHD container for Exchange Data Base Files:
DISKPART> select vdisk file=c:\POC\DataBaseFiles.vhdx
DiskPart successfully selected the virtual disk file.
DISKPART> expand vdisk maximum=50000
100 percent completed
DiskPart successfully expanded the virtual disk file.
DISKPART> attach vdisk
100 percent completed
DiskPart successfully attached the virtual disk file.
DISKPART> select disk 1
Disk 1 is now the selected disk.
DISKPART> list partition

| Partition ### | Type | Size | Offset |
|---|---|---|---|
| Partition 1 | Reserved | 128 MB | 17 KB |
| Partition 2 | Primary | 39 GB | 130 MB |

DISKPART> select partition 2
Partition 2 is now the selected partition.
DISKPART> extend size=6000
DiskPart successfully extended the volume.

According to the sample data shown in Table C above, the first differencing disk has been expanded by 50,000 MB ("expand vdisk maximum=50000"). A similar expansion operation can be performed for the second differencing disk.

Table D below shows commands and resulting output from the POC for executing Exchange PowerShell for creating a recovery Mail Box.

TABLE D

[PS] C:\Windows\system32>New-MailboxDatabase-Recovery -Name RDBZ002-Server
AVB107 -EdbFilePath "F:\Program Files\Microsoft\Exchange Server\V14\Mailbox\Mailbox
Database 0911649721\Mailbox Database 0911649721.edb" -LogFolderPath "E:\Program Files\Microsoft\Exchange Server\V14\Mailbox\Mailbox Database 0911649721"
WARNING: Recovery database 'RDBZ002' was created using existing file F:\Program Files\Microsoft\ExchangeServer\V14\Mailbox\Mailbox Database 0911649721\Mailbox Database 0911649721.edb. The database must be brought into a clean shutdown state before it can be mounted.

| Name | Server | Recovery | ReplicationType |
|---|---|---|---|
| RDBZ002 | AVB107 | True | None |

FIG. 13 shows another specific embodiment of the system shown in FIG. 1 to illustrate starting a virtual machine. The architecture of the environment shown in FIG. 13 includes a production node 1305, a backup storage node 1310, and a recovery node 1315, each of which are interconnected by a network 1320.

The production node includes a backup application module 1323, a virtual machine 1326 having a virtual hard disk 1335 to be backed up, virtual machine management services 1329, and a hypervisor 1332. A node may further include other hardware and software components such as described in the discussion accompanying FIG. 1. For example, physical hardware 1335 of a node may include physical storage, memory, a processor, network interface, and so forth.

The production node may be referred to as a host. The node may host any number of virtual machines. For example, there may be 1, 2, 3, 4, 5, 10, 50, 100, or more than 100 virtual machines. The backup application module at the node provides for the backup of one or more of the hosted virtual machines and corresponding virtual hard disks to the backup storage node.

In an embodiment, the backup application module interacts with the virtual machine management services or virtualization software on the host computer to backup and restore virtual machines. One specific example of a virtual machine management service includes the Microsoft Virtual Machine Management (VMMS) service. In a specific embodiment, the backup application module directs, instructs, or controls the operation of VMMS to backup and restore a virtual machine.

As part of the virtual machine backup, there can be a configuration file associated with the virtual machine that is backed up along with the virtual machine. For example, as shown in the example of FIG. 13, the backup storage node includes a virtual machine backup 1338 including a virtual hard disk backup 1342 which correspond to the virtual machine and virtual disk at the production node. The backup further includes configuration and state files 1345 that are associated with the backed up virtual machine. The files store information such as disk location information that allows the virtual machine to be properly started.

In a specific embodiment, the virtualization software or platform of the node includes Hyper-V from Microsoft. As discussed, it should be appreciated that while some embodiments are shown and described in conjunction with Hyper-V, aspects and principles of the system can be applicable to other virtualization platforms and services.

In this specific embodiment, the hypervisor is a thin layer of software between the hardware and virtual machines. The hypervisor is responsible for ensuring partition isolation and managing memory. The virtual machine management OS may be located in a specialized partition referred to as the parent partition and may include the virtualization stack and hardware specific device drivers. Virtual machines are in guest partitions and go through the parent partition for their device access.

In other words, a virtual machine environment may utilize a hypervisor (e.g., Hyper-V) to create and run the virtual machines. A computer running the hypervisor is a host machine and all virtual machines are guest machines running guest operating systems (OS). The hypervisor provides the guest operating systems with a virtual operating platform and manages the execution of the VMs. In an embodiment, the backup application module is configured to operate with the Hyper-V hypervisor, which is a native hypervisor that creates VMs on Intel x86-64 based systems and is an integral part of the Microsoft Windows server products. In general, Hyper-V implements isolation of virtual machines in terms of a partition, which is a logical unit of isolation, supported by the hypervisor, in which each guest operating system executes. A hypervisor instance has to have at least one parent partition. The virtualization stack runs in the parent partition and has direct access to the hardware devices. The parent partition then creates the child partitions which host the guest OSs. A parent partition creates child partitions using an API.

As shown in the example of FIG. 13, the recovery node includes a backup application module 1350, a recovered virtual machine 1355 (corresponding to backed up virtual machine 1338), and virtual machine management services 1360. The backup application module can leverage the services provided by the virtual machine management services to recover the backed up virtual machine to the recovery node. The recovered virtual machine includes a differencing virtual hard disk 1363 that is pointed 1364 to the archived virtual hard disk at the backup storage node. The archived virtual hard disk is in a read-only mode and the differencing virtual hard disk is in a read-write mode. This allows the virtual machine to be started even though the archived virtual hard disk remains in the read-only mode.

The recovered virtual machine further includes a configuration file 1366 associated with the backed up virtual machine. In brief, in an embodiment, to start the archived virtual machine, the configuration file is copied from the backup storage node to the recovery node. The backup application module accesses and reads the configuration file to create a planned virtual machine corresponding to the backed up virtual machine, modifies settings of the planned virtual machine to point to the differencing virtual hard disk, modifies paths of the planned virtual machine to identify a path of the configuration file on the recovery node, and realizes the modified planned virtual machine. Further detail is provided below.

Figure 14:
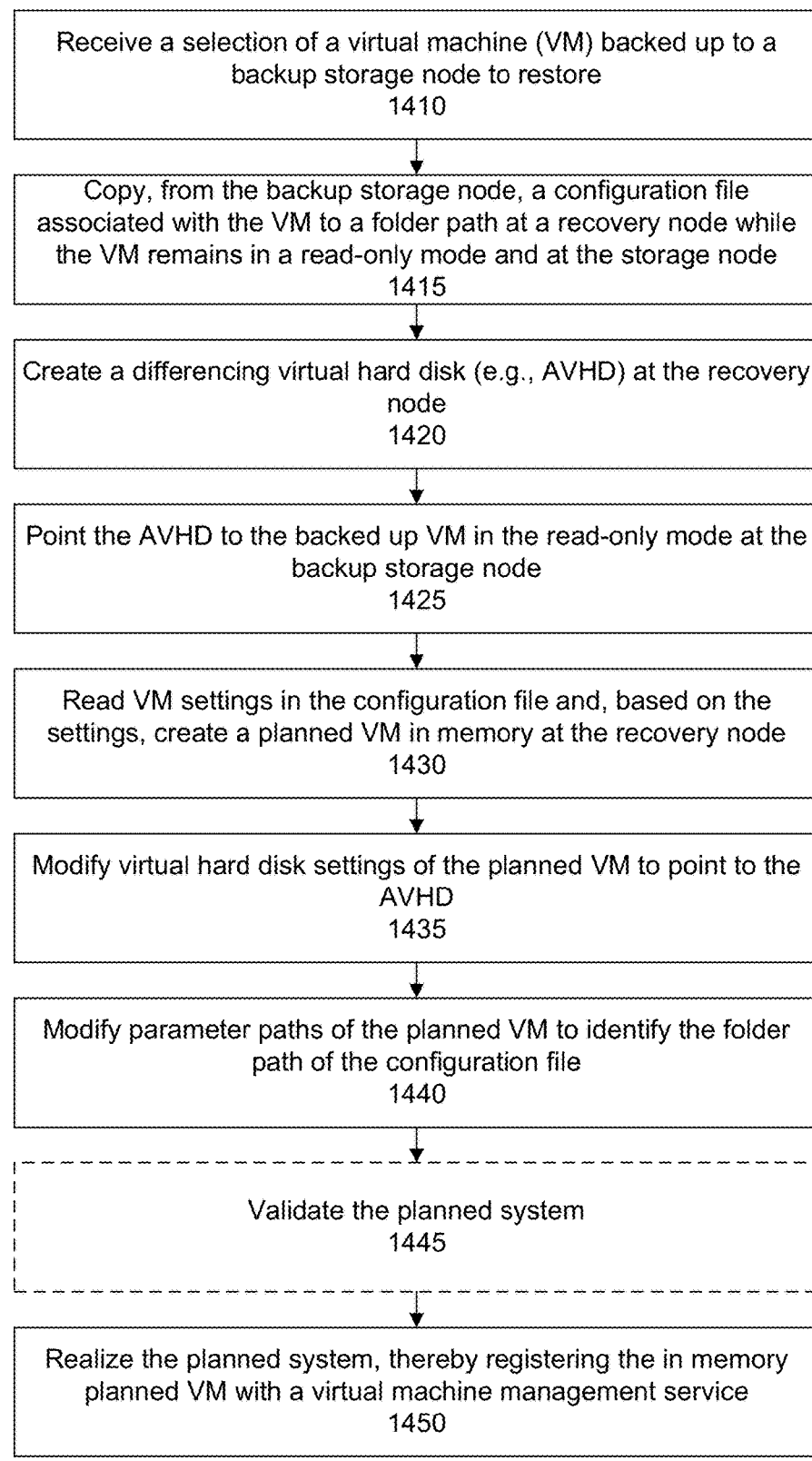
FIG. 14 shows an overall flow for instantly starting a backed up virtual machine, under some embodiments.

FIG. 14 shows a flow for the instant or near-instant start of a virtual machine that has been archived to backup media. In a step 1410, the system receives a selection of a virtual machine backed up to a backup storage node to start. For example, the backup management console may present or cause the display of a GUI to the backup administrator. The GUI may include a listing of virtual machines that have been backed up. The backup administrator can browse the listing and select (e.g., using a pointing device such as a mouse) a virtual machine to recover. Instead or additionally, there can be a command line interface, application programming interface (API), or both through which a selection may be received.

In a step 1415, a virtual machine configuration file that has been backed up with the selected virtual machine to start is copied by the backup application module from the backup storage node to a path at the recovery node while the virtual machine itself (e.g., virtual hard disk) remains in a read-only mode at the storage node. The configuration file is relatively very small in size as compared to the backed up virtual hard disk. For example, the configuration file may be several kilobytes (KB), e.g., 1-2 KB, while the virtual hard disk may be several GBs in size. Thus, the copying of the configuration file takes much less time and fewer resources as compared to having to copy the backed up virtual hard disk. The configuration file may be formatted as an extensible markup language (XML) file. The configuration file may include information such as the number of virtual hard disks associated with the virtual machine, networking configuration associated with the virtual machine, and so forth.

In embodiment, the backed up virtual machine that is to be started is a full or synthetic full backup. The virtual machine may include a configuration XML file and one or more virtual hard disks. In an embodiment, backups of the virtual machine include incremental backups. The incremental backups to the backup storage node may be merged at the backup storage node with a previous backup to synthesize a full image of the virtual machine. The full image of the virtual machine is stored and archived on the backup storage device.

In a step 1420, a differencing virtual hard disk is created at the recovery node. In a step 1425, the differencing virtual hard disk at the recovery node is pointed to the backed up virtual machine (e.g., backed up virtual hard disk) at the backup storage node.

In a step 1430, the backup application module reads the virtual machine settings stored in the configuration file and, based on the settings, creates a planned virtual machine in memory at the recovery node. For example, some types of virtualization platforms, such as Hyper-V, employ a two-stage process for importing a virtual machine. The import is "planned" so that configuration changes can be made prior to realizing the virtual machine, i.e., converting the planned virtual machine into a real virtual machine that is registered with the virtual machine management services, and can be started and visible.

In a step 1435, virtual hard disk settings of the planned virtual machine are modified, changed, or altered so that the planned virtual machine points to or is associated with the differencing virtual hard disk at the recovery node.

In a step 1440, paths or parameters of the planned virtual machine are modified to identify the path location of the configuration file that has been copied to the recovery node. For example, the original path information from the backup may not reflect the new location at which the VM is to be restarted (e.g., recovery node). In a specific embodiment, there is a first parameter for the path of a directory where information about the virtual machine configuration is stored. This allows the virtual machine when realized to be able to identify the location of the configuration file on persistent storage. In other words, when the hypervisor reboots, the hypervisor will know where to look for the configuration file. There is a second parameter for the path of a directory where information about the virtual machine snapshots is stored. These snapshots help to facilitate the creation of checkpoints. This allows, if desired, a VM to be reverted to previous point-in-time checkpoint. There is a third parameter for the path of a directory where swap files for the virtual machine are stored. The swap files facilitate management of RAM and hard disk.

In a step 1445, the planned system is validated. In FIG. 14, step 1445 is shown in broken lines to indicate that validating may be optional. For example, if the backup administrator feels comfortable with the configuration settings of the planned virtual machine (e.g., configuration paths were properly identified), the backup administrator may elect to skip the validation step.

In a step 1450, the planned system is realized, thereby registering the in memory planned virtual machine with the virtual machine management services.

In a specific embodiment, a size of the differencing disk for a virtual machine does not have to be expanded or increased because the data for the VM is already natively stored in a virtual hard disk format. Thus, there can be free space in the virtual disk of the VM. Other applications (e.g., Exchange), however, may not necessarily store their data in the virtual hard disk format (e.g., VHD/VHDx formats). Files having a file format other than VHD/VHDx, however, can be placed into a VHD/VHDx container. In these cases, differencing disks are expanded in size so that writes can be performed.

Figure 15:
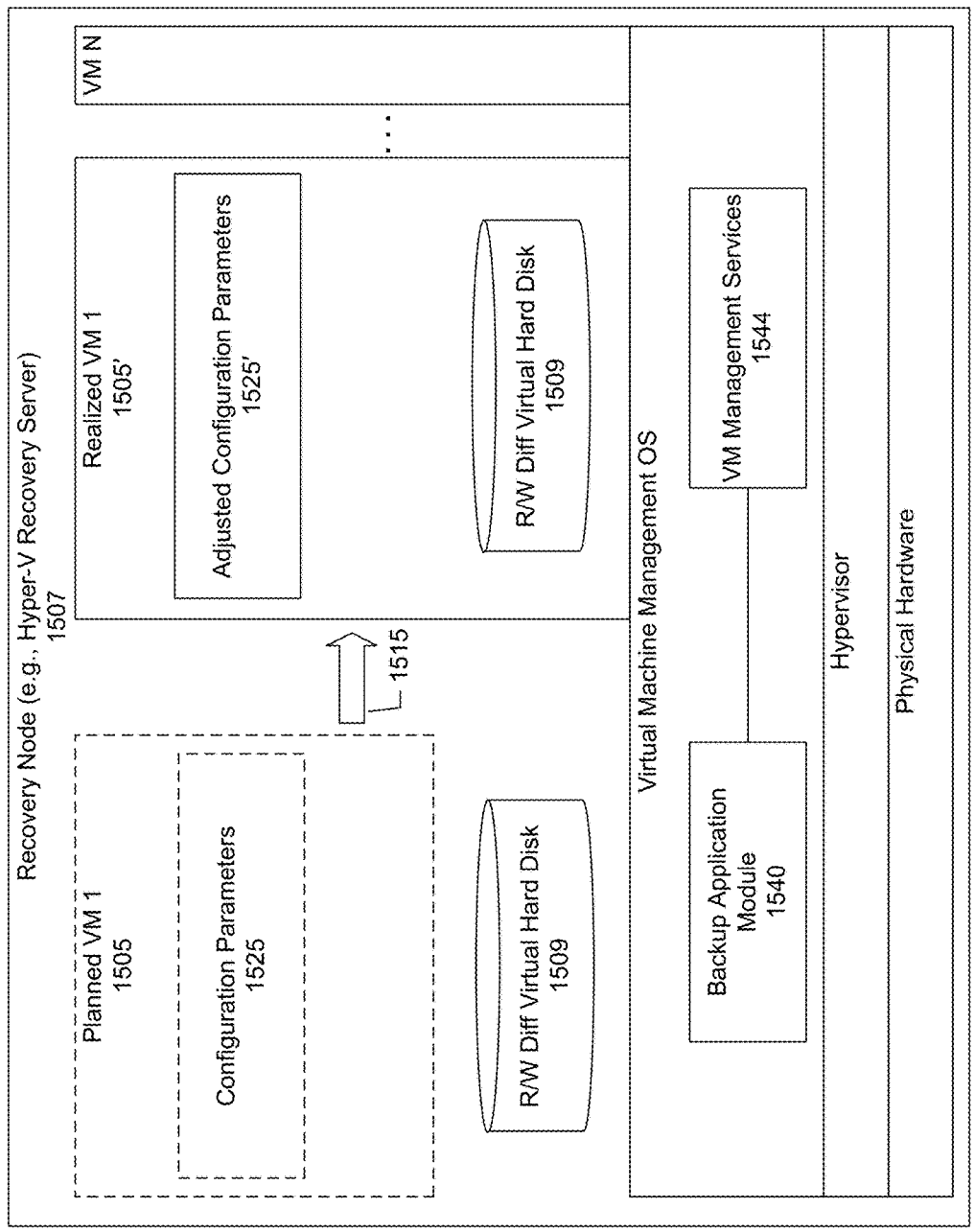
FIG. 15 shows a block diagram of converting a planned virtual machine to a realized virtual machine, under some embodiments.

FIG. 15 is a block diagram showing an example of a planned virtual machine VM 1 1505 having been created on the recovery node 1507. The recovery node includes a differencing virtual hard disk 1509 pointing to a virtual hard disk of a virtual machine backed up to backup storage. The planned virtual machine allows changes to be made to configuration parameters 1525 associated with the virtual machine before the virtual machine is realized or converted 1515 to a real virtual machine 1505'.

The planned virtual machine may include a set of configuration parameters 1525 (or a structure or data structure storing configuration values). The virtualization platform of the recovery node, however, will not allocate computing cycles to the planned virtual machine until the planned virtual machine is converted into realized virtual machine 1505' (e.g., virtual machine registers with the virtualization platform as a realized virtual machine).

Backup application module 1540, however, can interact with the planned virtual machine by directing the adjustment of one or more configuration parameters 1525 using an interface provided by virtual machine management services 1544. For example, values for the configuration parameters may have been set to default or other values by the virtualization platform. In a specific embodiment, a configuration operation for the planned virtual machine includes modifying, altering, or changing virtual hard disk settings in the planned virtual machine to point to the differencing virtual hard disk on the recovery node. Changing the disk path to the differencing disk allows the virtual machine (once realized) to start and access the differencing disk which in turn points to its parent, i.e., the backed up virtual hard disk on backup storage. The backed up virtual hard disk can remain on backup storage in a read-only mode while write operations are made to the differencing disk on the recovery node. The changed configuration parameters including the changed virtual disk settings to the differencing disk are identified by reference number 1525'.

Other examples of configuration operations include allocating resources and adjusting network settings. A configuration parameter may be associated with disk, memory, network device, processor, or other hardware or virtual hardware component available for use by the virtual machine (e.g., virtual network device, virtual memory, virtual storage device, or virtual hard disk).

Figure 16:
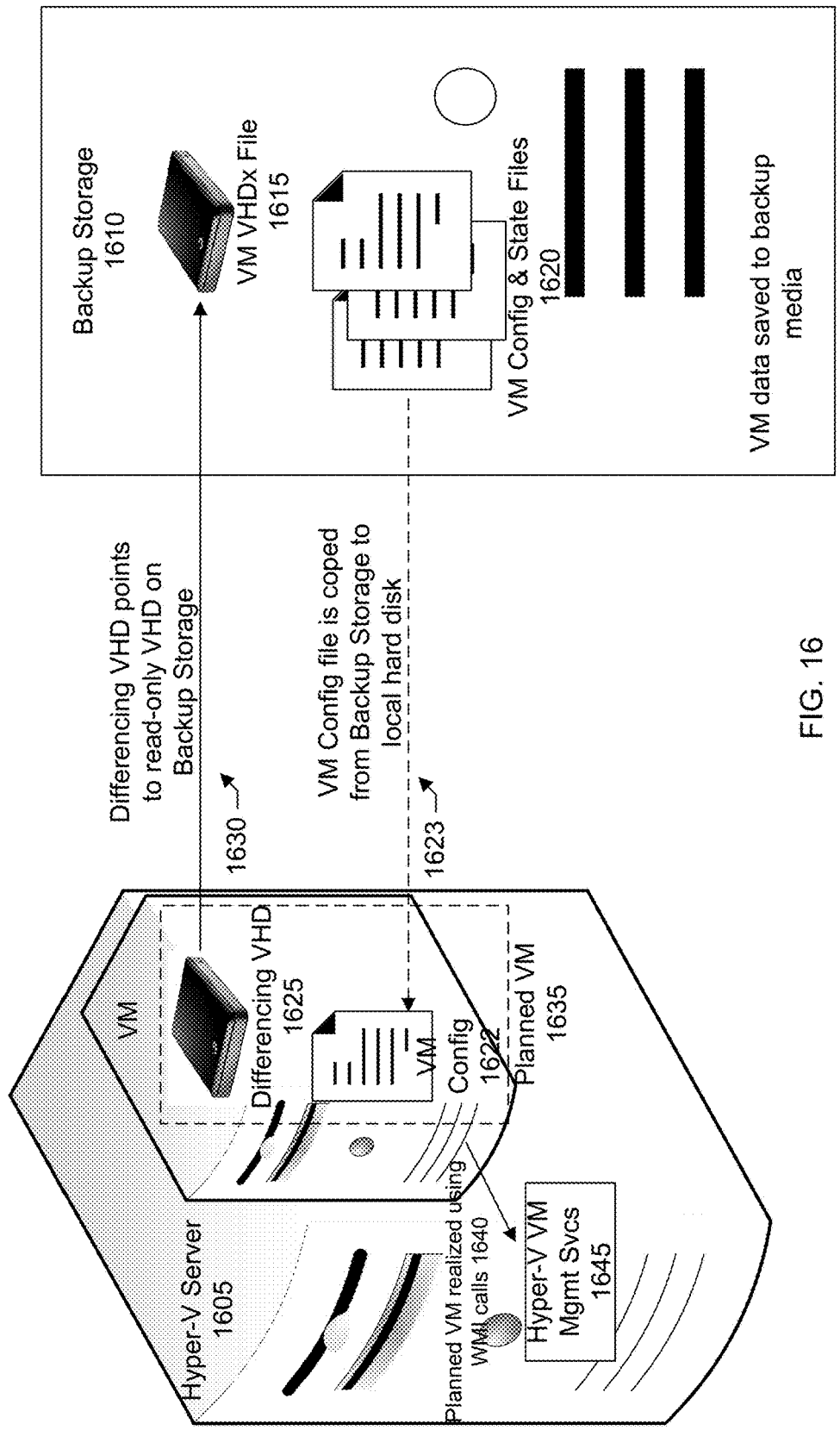
FIG. 16 shows a block diagram for instantly starting a backed up virtual machine, according to a specific embodiment.

FIG. 16 shows, as a further example, an architectural schematic for an instant or near-instant start of a virtual machine. In the example shown in FIG. 16, the virtual machine is a Hyper-V virtual machine. Hyper-V is becoming popular as a hypervisor in a data center. It is desirable that Hyper-V virtual machines be backed up regularly to protect against disaster and human errors. In a traditional restore of a virtual machine, the virtual hard disks (VHDs) are copied from the backup media to a Hyper-V server for starting the virtual machine. This copy operation needs time and requires free space in the Hyper-V server to hold the virtual hard disk. For example, if there is a backed up a virtual machine of 100 GB, a backup administrator would need 100 GB of free space on the same or another Hyper-V server to perform, for example, a backup integrity check or to run the virtual machine for data analytics.

In an embodiment, a backup application module is provided that supports incremental backup of virtual machines. The backup application synthesizes a full image of a virtual machine from the incremental backup and its previous backup. The synthesized copy of the virtual machine is stored on backup media (e.g., Data Domain device).

In some cases, when a user wants to start a virtual machine in case of disaster or human error, a backup application may first copy the data from the backup media (e.g., Data Domain) to a recovery server (e.g., Hyper-V server) and start the virtual machine. A limitation of a virtual machine is that it is generally not possible to start the virtual machine from the archive/read-only copy of virtual hard disk present on the backup media. Further, as the restore process involves coping of a virtual hard disk the RTO increases. There is also a requirement for space on recovery server (e.g., Hyper-V server) to restore a virtual machine.

To prove operability, a proof of concept was successfully implemented and executed for starting a Hyper-V virtual machine from its backed up data present on backup media (e.g., Data Domain). Using this technology, virtual machines can be started using its archived copy, without copying the data to the Hyper-V server. The virtual machine can be started in a few seconds.

This technology also helps to ensure that the backup copy is not changed at all by creating a differential virtual hard disk. Systems and techniques are described herein for starting a virtual machine from its archive copy in the backup media without changing it. Zero or near-zero RTO (recovery time objective) for virtual machines can be achieved using this method.

For the Proof of Concept (POC), a method was developed to start a virtual machine without copying its virtual hard disk from the backup media. Thus a virtual machine can be started from its backup copy instantly with zero RTO. In an embodiment, the virtual machine administrator can use system center tools of the virtualization platform to move the virtual hard disk of the virtual machine while they are online.

It is also desirable that the backed up copy of the virtual machine remains unchanged for compliance and future use. In an embodiment, a differencing disk is created on the recovery server (e.g., Hyper-V Server) and is pointed to the parent disk on the backup media. Using this technology the backed up data of a virtual machine on the backup media can be accessed by the recovery server in very little time. The write operations on the virtual machine are stored in the differential virtual hard disk. Thus, the archive copy remains unchanged.

The instant restore of virtual machines are useful on the following cases:

1) Instant start of a virtual machine from the backup media with zero RTO.

2) Performing restore test of a virtual machine without copying the data to the recovery server.

3) To search a backup version without restoring it.

In other words, systems and techniques are provided to start a virtual machine from its archive copy on a backup media device. This helps in restoring the virtual machine in very little time in order to achieve zero RTO. As discussed, it is also desirable that the backed up copy of the virtual machine remains unchanged for compliance and future use. In an embodiment, a differencing disk is created on the recovery server (e.g., Hyper-V Server) and is pointed it to the parent disk on the backup media (e.g., Data Domain). Using this technology the data of the backed up virtual machine on the backup media can be accessed by the recovery serer in very little time. The writes to the virtual machine are stored in the differential hard disk, so the archive copy remains unchanged.

As shown in the architectural diagram example of FIG. 16, there is a recovery node 1605 (e.g., Hyper-V server) and a backup media 1610 (e.g., Data Domain). The backup media includes a backup of a virtual hard disk file 1615 of a virtual machine and a backup of configuration and state files 1620 associated with the virtual machine.

A virtual machine configuration file 1622 is copied 1623 from the backup media to the recovery node. A differencing virtual hard disk 1625 is created at the recovery node. The differencing disk is pointed 1630 to a read-only virtual hard disk of the backed up virtual machine on the backup media (steps 1415-1425, FIG. 14). Virtual machine settings specified in the copied configuration file are read to create a planned virtual machine 1635 in memory at the recovery node. After the planned virtual machine has been created, virtual hard disk settings of the planned virtual machine are modified to point to the differencing virtual hard disk at the recovery node. The planned virtual machine may then be realized. For example, in embodiments involving a Hyper-V environment, issued calls 1640 may include Windows Management Instrumentation (WMI) calls to Hyper-V virtual machine management services 1645.

Table E below shows a procedure of the instant restore architecture flow for the POC.

TABLE E

| Step | Description |
|---|---|
| 1 | User chooses the virtual machine for instant restore from backup application (e.g., NMM) GUI. |
| 2 | NMM copies the Virtual Machine configuration file from Data Domain to local hard disk (e.g., C:\POCInstStart). |

TABLE E-continued

| Step | Description |
|---|---|
| 3 | NMM creates a differencing virtual hard disk that points to the read only virtual hard disk of the backed up virtual machine on backup storage (e.g., Data Domain). |
| 4 | NMM executes WMI (Windows Management Instrumentation) calls to:<br>a) Read virtual machine settings to create a planned VM in memory<br>b) Modify the virtual hard disk in the settings of the planned VM to point the differential hard disk on the recovery node (e.g., Hyper-V Server).<br>c) Modify the configuration, snapshot, swapfile path to a path on the local hard disk corresponding to the path location of the copied configuration file, e.g., C:\POCInstStart<br>d) Validate the planned system<br>e) Realize the planned system |

Tables F-K below show steps performed within the POC to start a VM on a Data Domain device. Specifically, Table F below shows commands and resulting output for creating a differencing virtual hard disk on a Hyper-V Server that point to the backed up virtual hard disk on Data Domain.

TABLE F

```
//Create a Differencing VHDX
PS C:\> New-VHD -Path "C:\DebugIncr\POCDiff.vhdx" -ParentPath
"\\nmmda243 \NewAFTD\92\77\f40ce447-00000006-7f883831-
56883831-01820c00-87fd8c29.vhdx" -Differencing
ComputerName : NMMDA043
Path : C:\DebugIncr\POCDiff.vhdx
VhdFormat : VHDX
VhdType : Differencing
FileSize : 4194304
Size : 18253611008
Minimum Size :
Logical SectorSize : 512
Physical SectorSize : 4096
BlockSize : 2097152
ParentPath : \\nmmda243\NewAFTD\92\77\f40ce447-00000006-
7f883831-56883831-01820c00-87fd8c29.vhdx
DiskIdentifier : 22e4ac3e-03aa-40ab-ac23-ff5533e3cb2c
FragmentationPercentage :
Alignment : 1
Attached : False
DiskNumber :
Key :
IsDeleted : False
Number:
```

Table G below shows commands and resulting output for restoring the VM configuration XML and reading the virtual machine settings to create a planned VM in memory.

TABLE G

```
$Msvm Virtual SystemManagementService = Get-WmiObject -Namespace
root\virtualization\v2-Class Msvm_VirtualSystemManagementService
$Msvm_VirtualSystemSnapshotService = Get-WmiObject -Namespace
root\virtualization\v2 - Class Msvm_Virtual SystemSnapshotService
$ImportSystemDefinition_net =
$Msvm_VirtualSystemManagementService.ImportSystemDefinition("C:\myHyperVDir\DemoV
MForInstStart\Virtual Machines\1AAA1760-E8B1-4984-9072-CB49AACCFA97.xml",
"C:\myHyperVDir\DemoVMForInstStart\Snapshots", $true)
$Msvm_ComputerSystem = [WMI]$ImportSystemDefinition_net.ImportedSystem
```

Table H below shows commands and resulting output for modifying the virtual hard disk in the settings of the planned VM to point the differential hard disk on the Hyper-V server.

TABLE H

```
$Msym_VirtualSystemSettingData =
($Msym_ComputerSystem.GetRelated("Msym_VirtualSystemSettingData",
"Msvm_SettingsDefineState", $null, $null, "SettingData", "ManagedElement",
$false, $null) |% {$_})
foreach ($Msym_StorageAllocationSettingData in
$Msym_VirtualSystemSettingData.GetRelated("Msvm_StorageAllocationSett
ingData"))
{
$Msvm_StorageAllocationSettingData.HostResource = @("C:\POCInstStart\Virtual Hard
Disks\POCDiff.vhdx")
$Msvm_VirtualSystemManagementService.ModifyResourceSettings($Msym_StorageAllocation
SettingData.GetText(2))
}
```

Table I below shows commands and resulting output for modifying the configuration, snapshot, and swapfile path.

TABLE I

```
$Msvm_VirtualSystemSettingData.ConfigurationDataRoot = "C:\POCInstStart"
$Msvm_VirtualSystemSettingData.SnapshotDataRoot = "C:\POCInstStart"
$Msym_VirtualSystemSettingData.SwapFileDataRoot = "C:\POCInstStart"
$Msvm_VirtualSystemManagementService.ModifySystemSettings($Msym_VirtualSystemSettin
gData.GetText(2))State of "Clustered Shared Volume VSS Writer" on each node
```

Table J below shows commands and resulting output for validating the planned system (optional but recommended).

TABLE J

```
$Msym_VirtualSystemManagementService.ValidatePlannedSystem
($Msvm_ComputerSystem)
```

Table K below shows commands and resulting output for realizing the planned system.

TABLE K

```
$Msvm_VirtualSystemManagementService.RealizePlannedSystem
($Msvm_ComputerSystem)
```

Figure 17:
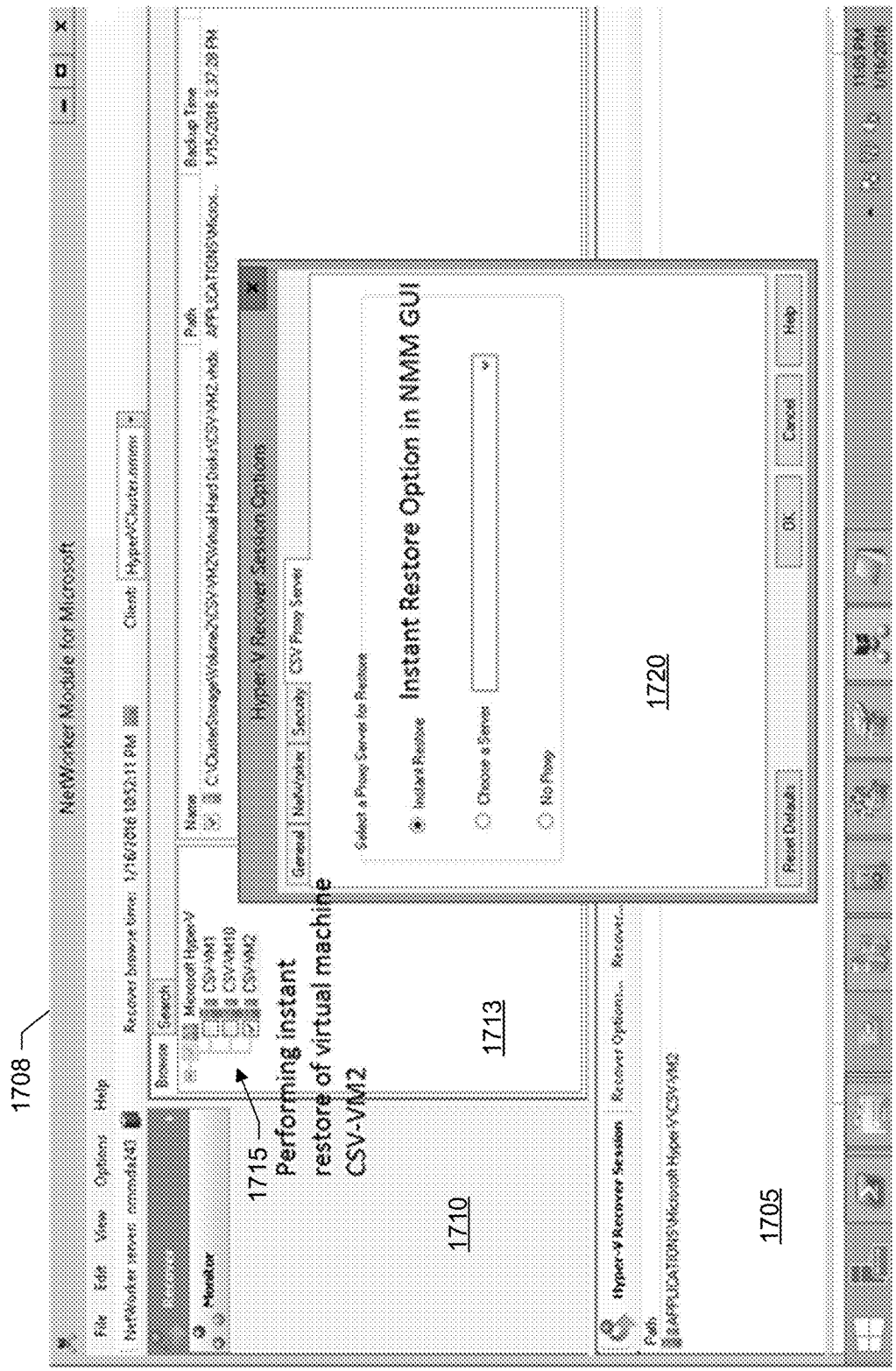
FIG. 17 shows a screenshot for selecting a virtual machine for instant restore, according to a specific embodiment.

FIG. 17 shows a screenshot 1705 of a GUI in a backup application (e.g., Networker Module for Microsoft or NMM) for selecting a virtual machine for instant restore. A window 1708 includes first and second panes 1710, 1713, respectively. The first pane lists some actions available in the backup application (e.g., "Recover" and "Monitor"). In this example, the backup administrator has selected the "Recover" option. The second pane includes a listing 1715 of backed up virtual machines and a set of checkboxes. The administrator can browse the list and select a virtual machine for recovery. As indicated by the checked box, the administrator has selected the virtual machine, "CSV-VM2" for performing an instant restore.

A dialog box 1720 is shown with various options for recovery. As indicated by the filled radio button in the dialog box, the administrator has selected the "Instant Restore" option. Upon the administrator clicking the "OK" button in the dialog box the backup application executes the processes described above for instantly restoring the selected virtual machine (see, e.g., steps 1415-1450, FIG. 14 and accompanying discussion).

Figure 18:
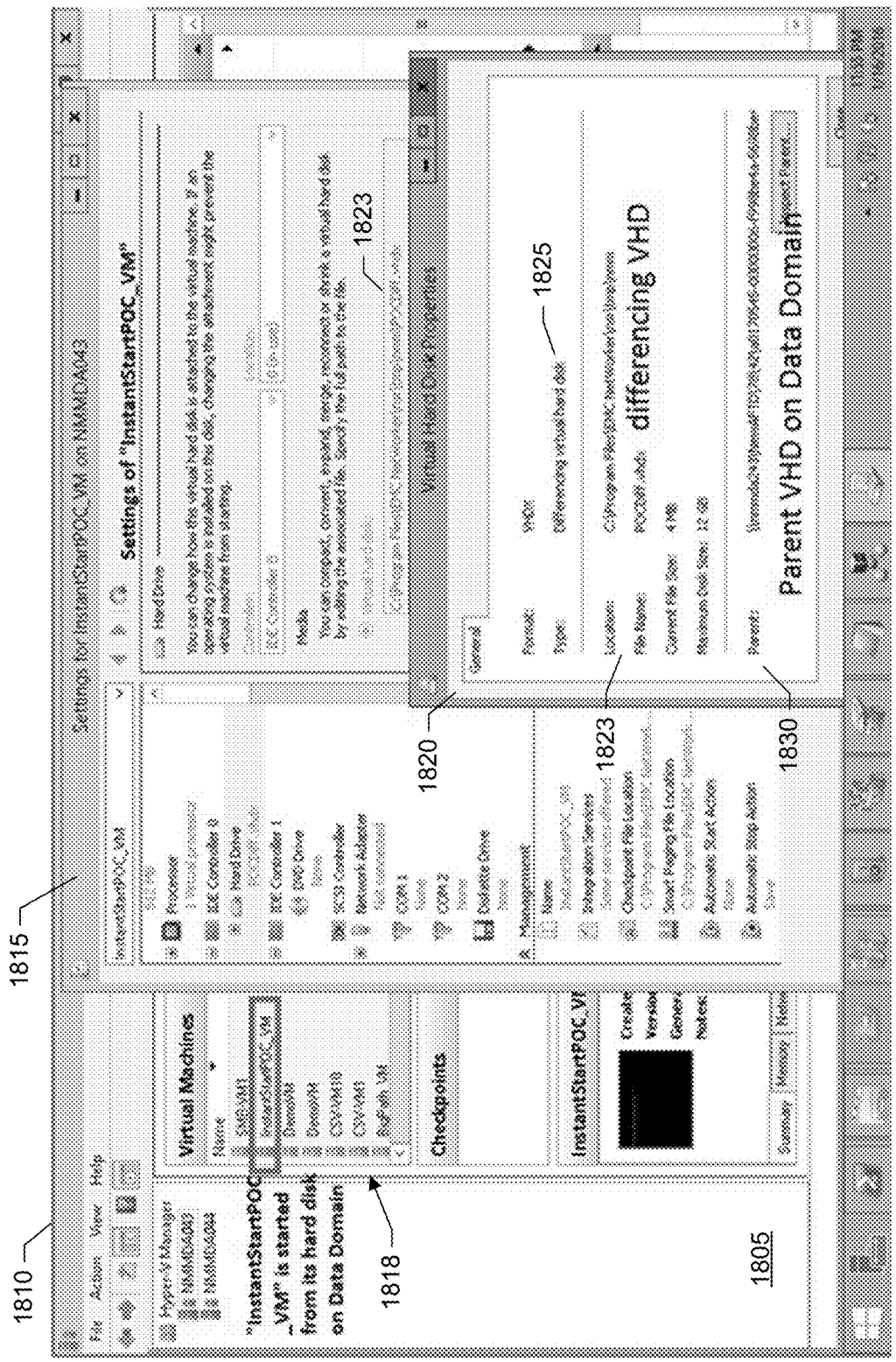
FIG. 18 shows a screenshot of properties of the instantly started virtual machine, according to a specific embodiment.

FIG. 18 shows a screenshot 1805 of a GUI in a virtual machine manager (e.g., Hyper-V) showing virtual hard disk properties of a virtual machine after the instant restore process. This screenshot includes a window 1810, and first and second dialog boxes 1815, 1820, respectively. The window includes a listing of virtual machines 1818 where a virtual machine named "InstantStartPOC_VM" has been selected in order to view its properties.

The first dialog box shows settings of the selected virtual machine "InstantStartPOC_VM." In particular, as shown by a box 1823, the selected virtual machine includes a virtual hard disk identified as "POCDiff.vhdx" that is located on local C:\ drive. The second dialog box shows further details of the virtual hard disk. Specially, a type property 1825 indicates that the virtual disk is a "Differencing virtual disk." The differencing disk has a parent 1830 located at the backup storage (e.g., Data Domain).

Figure 19:
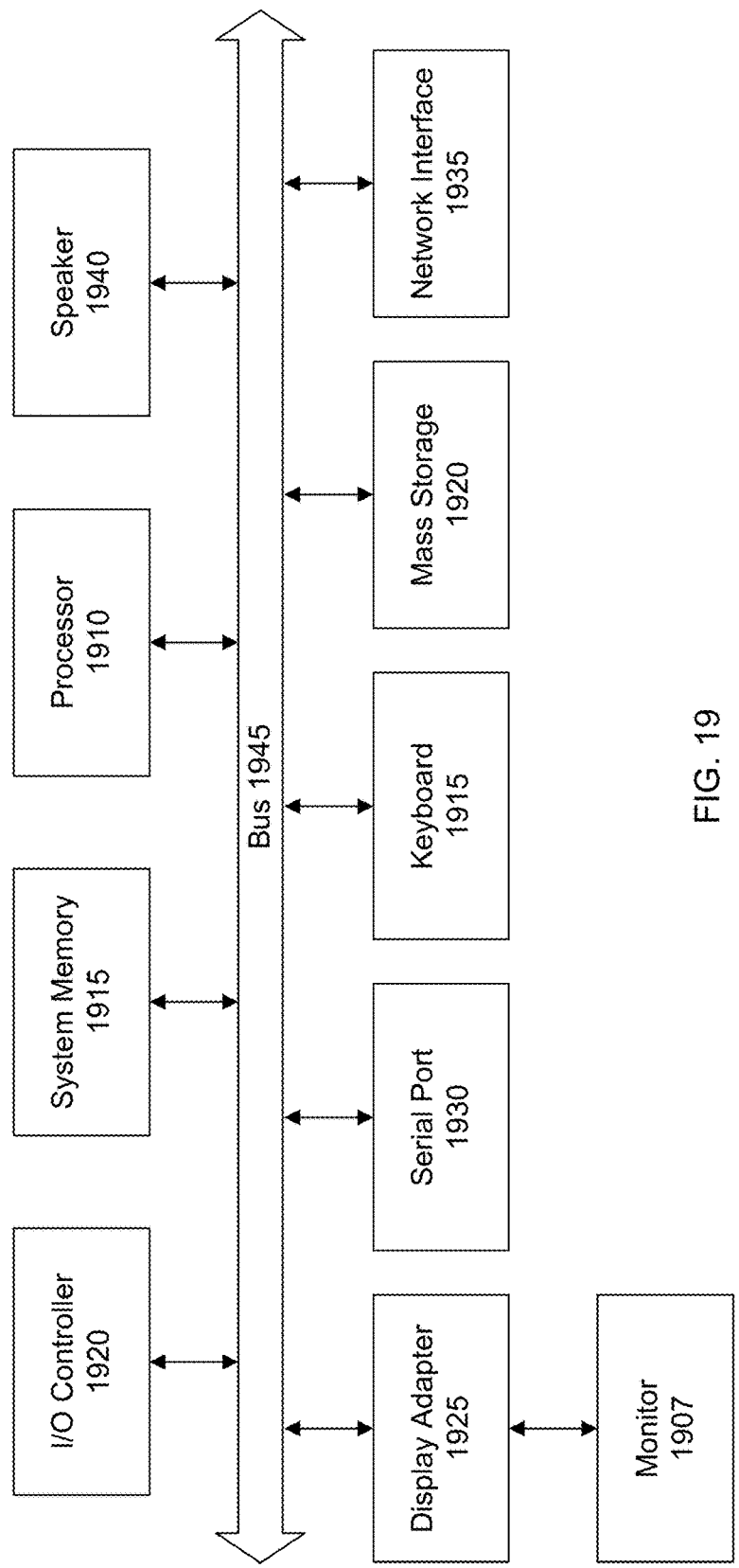
FIG. 19 shows a block diagram of a computer system suitable for use with the system, under some embodiments.

FIG. 19 shows a system block diagram of a computer system used to execute the software of the present system described herein. The computer system 1905 includes a monitor 1907, keyboard 1915, and mass storage devices 1920. Computer system 1905 further includes subsystems such as central processor 1910, system memory 1915, input/output (I/O) controller 1920, display adapter 1925, serial or universal serial bus (USB) port 1930, network interface 1935, and speaker 1940. The system may also be used with computer systems with additional or fewer subsystems. For example, a computer system could include more than one processor 1910 (i.e., a multiprocessor system) or a system may include a cache memory.

Arrows such as 1945 represent the system bus architecture of computer system 1905. However, these arrows are illustrative of any interconnection scheme serving to link the subsystems. For example, speaker 1940 could be connected to the other subsystems through a port or have an internal direct connection to central processor 1910. The processor may include multiple processors or a multicore processor, which may permit parallel processing of information. Computer system 1905 shown in FIG. 19 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications can be updated (e.g., periodically) via a direct internet upgrade patching mechanism or through an applications store (e.g., Apple iTunes and App store, Google Play store, and Windows Phone App store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

In a specific embodiment, a method includes receiving a selection of an object that has been backed up onto a backup media server; creating, at a recovery server, separate from the backup media server, a differencing virtual hard disk; pointing the differencing virtual hard disk to the object backed up onto the backup media server; determining whether the object is of a first type or a second type, the first type being a backup of a virtual machine, and the second type being a backup of an object that is not a backup of a virtual machine; if the object is of the first type, copying from the backup media to the recovery server a configuration file associated with the virtual machine; creating a planned virtual machine at the recovery server based on the configuration file; modifying settings in the planned virtual machine so that the planned virtual machine points to the differencing virtual hard disk at the recovery server; modifying parameters of the planned virtual machine to identify a path location of the configuration file on the recovery server; and realizing the planned virtual machine; and if the object is of the second type, increasing a size of the differencing virtual hard disk, a size of the differencing virtual hard disk thereby being increased when the object is of the second type, and not being increased when the object is of the first type. Determining whether the object is the first or second type may include reviewing a backup catalog that identifies the object as being one of the first or second type.

In a specific embodiment, a method includes accessing a backup of an application stored in a container on a backup media server, the container being formatted as a virtual hard disk, the virtual hard disk being in a read-only mode; creating, at a recovery server, separate from the backup media server, a differencing virtual hard disk; pointing the differencing virtual hard disk to the container; increasing a size of the differencing virtual hard disk; mounting the differencing virtual hard disk onto the recovery server; and allowing writes to be made to the differencing virtual hard disk mounted at the recovery server while the virtual hard disk remains in the read-only mode on the backup media server.

In an embodiment, after the creating a differencing virtual hard disk, the differencing virtual hard disk comprises a first size that is equal to a size of the virtual hard disk, and wherein after the increasing a size of the differencing virtual hard disk, the differencing virtual hard disk comprises a second size, greater than the first size.

In an embodiment, the method includes determining a size of the virtual hard disk; and increasing the size of the differencing virtual hard disk by a percentage of the size of the virtual hard disk. In another embodiment, the increasing a size of the differencing virtual hard disk comprises increasing the size by an absolute value. The method may include receiving, from a user, a value indicating an amount that the differencing virtual hard disk should be increased. In an embodiment, the method includes creating, from the differencing virtual hard disk, a recovery database.

In an specific embodiment, the container is a first container, the virtual hard disk is a first virtual hard disk, the differencing virtual hard disk is a first differencing virtual hard disk, and the method comprises: creating, at the recovery server, a second differencing virtual hard disk; pointing the second differencing virtual hard disk to a second container formatted as a second virtual hard disk on the backup media server, the second virtual hard disk being in the read-only mode; increasing a size of the second differencing virtual hard disk; mounting the second differencing virtual hard disk onto the recovery server; and allowing writes to be made to the second differencing virtual hard disk mounted at the recovery server while the second virtual hard disk remains in the read-only mode on the backup media server, wherein the application comprises a database and log files associated with the database, the database is backed up into the first container, and the log files are backed up into the second container, and wherein the second differencing virtual hard disk has been increased by a size greater than a size by which the first differencing virtual hard disk has been increased.

In another specific embodiment, there is a system for disaster restore of a big data application with near zero recovery time objective, the system comprising: a processor-based system executed on a computer system and configured to: access a backup of an application stored in a container on a backup media server, the container being formatted as a virtual hard disk, the virtual hard disk being in a read-only mode; create, at a recovery server, separate from the backup media server, a differencing virtual hard disk; point the differencing virtual hard disk to the container; increase a size of the differencing virtual hard disk; mount the differencing virtual hard disk onto the recovery server; and allow writes to be made to the differencing virtual hard disk mounted at the recovery server while the virtual hard disk remains in the read-only mode on the backup media server.

In another specific embodiment, there is a computer program product, comprising a non-transitory computer-readable medium having a computer-readable program code embodied therein, the computer-readable program code adapted to be executed by one or more processors to implement a method comprising: accessing a backup of an application stored in a container on a backup media server, the container being formatted as a virtual hard disk, the virtual hard disk being in a read-only mode; creating, at a recovery server, separate from the backup media server, a differencing virtual hard disk; pointing the differencing virtual hard disk to the container; increasing a size of the differencing virtual hard disk; mounting the differencing virtual hard disk onto the recovery server; and allowing writes to be made to the differencing virtual hard disk mounted at the recovery server while the virtual hard disk remains in the read-only mode on the backup media server.

In a specific embodiment, a method includes creating, at a recovery server, a differencing virtual hard disk; pointing the differencing virtual hard disk to a virtual machine that has been backed up to a backup media server; restoring, to the recovery server, a configuration file associated with the backed up virtual machine while the backed up virtual machine remains on the backup media server; creating a planned virtual machine from the configuration file; modifying virtual hard disk settings of the planned virtual machine to point to the differencing virtual hard disk at the recovery server; modifying parameters of the planned virtual machine based on a path of the configuration file as restored on the recovery server; and realizing the planned virtual machine.

In an embodiment, the virtual machine backed up to the backup media server is maintained in a read-only mode and remains in the read-only mode after the realizing the planned virtual machine. In an embodiment, the virtual machine backed up to the backup media server comprises a synthetic full backup of the virtual machine, the synthetic full backup comprising a full backup of the virtual machine, and at least one incremental backup of the virtual machine, wherein the at least one incremental backup of the virtual machine has been merged, at the backup media server, into the synthetic full backup of the virtual machine.

In an embodiment, the modifying parameters comprises: updating a first parameter of the planned virtual machine to indicate a location on the recovery server where information about virtual machine configuration data is stored; updating a second parameter of the planned virtual machine to indicate a location on the recovery server where information about virtual machine snapshots are stored; and updating a third parameter of the planned virtual machine to indicate a location on the recovery server where information about swap files are stored.

In an embodiment, during the realizing the planned virtual machine, the backed up virtual machine remains on the backup media server in a read-only mode. In an embodiment, after the realizing the planned virtual machine, the backed up virtual machine remains on the backup media server in a read-only mode.

In a specific embodiment, there is a system for instantly starting a virtual machine from an archive copy on a backup media server, the system comprising: a processor-based system executed on a computer system and configured to: create, at a recovery server, a differencing virtual hard disk; point the differencing virtual hard disk to the archive copy of the virtual machine on the backup media server; restore, to the recovery server, a configuration file associated with the archive copy of the virtual machine while the archive copy remains on the backup media server; create a planned virtual machine from the configuration file; modify virtual hard disk settings of the planned virtual machine to point to the differencing virtual hard disk at the recovery server; modify parameters of the planned virtual machine based on a path of the configuration file as restored on the recovery server; and realize the planned virtual machine.

In another specific embodiment, there is a computer program product, comprising a non-transitory computer-readable medium having a computer-readable program code embodied therein, the computer-readable program code adapted to be executed by one or more processors to implement a method comprising: creating, at a recovery server, a differencing virtual hard disk; pointing the differencing virtual hard disk to a virtual machine that has been backed up to a backup media server; restoring, to the recovery server, a configuration file associated with the backed up virtual machine while the backed up virtual machine remains on the backup media server; creating a planned virtual machine from the configuration file; modifying virtual hard disk settings of the planned virtual machine to point to the differencing virtual hard disk at the recovery server; modifying parameters of the planned virtual machine based on a path of the configuration file as restored on the recovery server; and realizing the planned virtual machine.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
   creating, at a recovery server, a differencing virtual hard disk;
   pointing the differencing virtual hard disk to a virtual machine that has been backed up to a backup media server;
   restoring, to the recovery server, a configuration file associated with the backed up virtual machine while the backed up virtual machine remains on the backup media server;
   creating a planned virtual machine from the configuration file;

modifying virtual hard disk settings of the planned virtual machine to point to the differencing virtual hard disk at the recovery server;

modifying parameters of the planned virtual machine based on a path of the configuration file as restored on the recovery server; and realizing the planned virtual machine, wherein the modifying parameters comprises:

updating a first parameter of the planned virtual machine to indicate a location on the recovery server where information about virtual machine configuration data is stored;

updating a second parameter of the planned virtual machine to indicate a location on the recovery server where information about virtual machine snapshots are stored; and updating a third parameter of the planned virtual machine to indicate a location on the recovery server where information about swap files are stored.

2. The method of claim 1 wherein the virtual machine backed up to the backup media server is maintained in a read-only mode and remains in the read-only mode after the realizing the planned virtual machine.

3. The method of claim 1 wherein the virtual machine backed up to the backup media server comprises a synthetic full backup of the virtual machine, the synthetic full backup comprising a full backup of the virtual machine, and at least one incremental backup of the virtual machine, wherein the at least one incremental backup of the virtual machine has been merged, at the backup media server, into the synthetic full backup of the virtual machine.

4. The method of claim 1 wherein during the realizing the planned virtual machine, the backed up virtual machine remains on the backup media server in a read-only mode.

5. The method of claim 1 wherein after the realizing the planned virtual machine, the backed up virtual machine remains on the backup media server in a read-only mode.

6. A system for instantly starting a virtual machine from an archive copy on a backup media server, the system comprising:

a processor-based system executed on a computer system and configured to:

create, at a recovery server, a differencing virtual hard disk;

point the differencing virtual hard disk to the archive copy of the virtual machine on the backup media server;

restore, to the recovery server, a configuration file associated with the archive copy of the virtual machine while the archive copy remains on the backup media server;

create a planned virtual machine from the configuration file;

modify virtual hard disk settings of the planned virtual machine to point to the differencing virtual hard disk at the recovery server;

modify parameters of the planned virtual machine based on a path of the configuration file as restored on the recovery server;

realize the planned virtual machine;

update a first parameter of the planned virtual machine to indicate a location on the recovery server where information about virtual machine configuration data is stored;

update a second parameter of the planned virtual machine to indicate a location on the recovery server where information about virtual machine snapshots are stored; and update a third parameter of the planned virtual machine to indicate a location on the recovery server where information about swap files are stored.

7. The system of claim 6 wherein the archive copy of the virtual machine backed up to the backup media server is maintained in a read-only mode and remains in the read-only mode after the realizing the planned virtual machine.

8. The system of claim 6 wherein the archive copy of the virtual machine backed up to the backup media server comprises a synthetic full backup of the virtual machine, the synthetic full backup comprising a full backup of the virtual machine, and at least one incremental backup of the virtual machine, wherein the at least one incremental backup of the virtual machine has been merged, at the backup media server, into the synthetic full backup of the virtual machine.

9. The system of claim 6 wherein during the realizing the planned virtual machine, the backed up virtual machine remains on the backup media server in a read-only mode.

10. The system of claim 6 wherein after the realizing the planned virtual machine, the backed up virtual machine remains on the backup media server in a read-only mode.

11. A computer program product, comprising a non-transitory computer-readable medium having a computer-readable program code embodied therein, the computer-readable program code adapted to be executed by one or more processors to implement a method comprising:

creating, at a recovery server, a differencing virtual hard disk;

pointing the differencing virtual hard disk to a virtual machine that has been backed up to a backup media server;

restoring, to the recovery server, a configuration file associated with the backed up virtual machine while the backed up virtual machine remains on the backup media server;

creating a planned virtual machine from the configuration file;

modifying virtual hard disk settings of the planned virtual machine to point to the differencing virtual hard disk at the recovery server;

modifying parameters of the planned virtual machine based on a path of the configuration file as restored on the recovery server; and realizing the planned virtual machine, wherein the modifying parameters comprises:

updating a first parameter of the planned virtual machine to indicate a location on the recovery server where information about virtual machine configuration data is stored;

updating a second parameter of the planned virtual machine to indicate a location on the recovery server where information about virtual machine snapshots are stored; and updating a third parameter of the planned virtual machine to indicate a location on the recovery server where information about swap files are stored.

12. The computer program product of claim 11 wherein the virtual machine backed up to the backup media server is maintained in a read-only mode and remains in the read-only mode after the realizing the planned virtual machine.

13. The computer program product of claim 11 wherein the virtual machine backed up to the backup media server comprises a synthetic full backup of the virtual machine, the synthetic full backup comprising a full backup of the virtual machine, and at least one incremental backup of the virtual machine, wherein the at least one incremental backup of the virtual machine has been merged, at the backup media server, into the synthetic full backup of the virtual machine.

14. The computer program product of claim 11 wherein during the realizing the planned virtual machine, the backed up virtual machine remains on the backup media server in a read-only mode.

15. The computer program product of claim 11 wherein after the realizing the planned virtual machine, the backed up virtual machine remains on the backup media server in a read-only mode.

* * * * *